US012789139B1

(12) United States Patent
Mohammed et al.

(10) Patent No.: US 12,789,139 B1
(45) Date of Patent: Nov. 10, 2026

(54) TRANSFORMING ATMOSPHERIC CARBON DIOXIDE INTO CALCIUM CARBONATE

(71) Applicant: King Fahd University of Petroleum and Minerals, Dhahran (SA)

(72) Inventors: Isah Mohammed, Dhahran (SA); Dhafer Abdullah Al Shehri, Dhahran (SA); Mohamed Mahmoud, Dhahran (SA); Abdulwahab Muhammed Bello, Dhahran (SA); Bassam Shafiq Tawabini, Dhahran (SA); Muhammad Shahzad Kamal, Dhahran (SA); Mobeen Murtaza, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 19/366,249

(22) Filed: Oct. 22, 2025

(30) Foreign Application Priority Data

Oct. 15, 2025 (SA) ................................ 1020257621

(51) Int. Cl.
*B01D 53/62* (2006.01)
*B01D 53/78* (2006.01)
*C01F 11/18* (2006.01)
*C04B 28/00* (2006.01)

(52) U.S. Cl.
CPC ............ *B01D 53/62* (2013.01); *B01D 53/78* (2013.01); *C01F 11/18* (2013.01); *C04B 28/00* (2013.01); *B01D 2251/404* (2013.01); *B01D 2251/60* (2013.01); *B01D 2257/504* (2013.01); *B01D 2258/06* (2013.01); *C01P 2002/85* (2013.01); *C01P 2004/03* (2013.01)

(58) Field of Classification Search
CPC .. B01D 53/62; B01D 53/78; B01D 2251/404; B01D 2251/60; B01D 2257/504; B01D 2258/06; C01F 11/18; C04B 28/00; C01P 2002/85; C01P 2004/03
See application file for complete search history.

(56) References Cited

U.S. PATENT DOCUMENTS

2025/0019254 A1 1/2025 Schweitzer et al.

FOREIGN PATENT DOCUMENTS

KR 10-1970265 B1 4/2019
KR 10-2023-0108747 A 7/2023
WO WO 98/24725 6/1998

OTHER PUBLICATIONS

Isah Mohammed, et al., "Production of colloidally stable calcium carbonate precipitates to enhance CO2 subsurface storage through mineralization", Geoenergy Science and Engineering, vol. 243, Article 213339, Dec. 2024 (excerpts only; 8 pages).
Jonas Heuer, et al., "Enhanced sequestration of carbon dioxide into calcium carbonate using pressure and a carbonic anhydrase from alkaliphilic Coleofasciculus chthonoplastes", Engineering in Life Sciences, vol. 22, Issue 3-4, Jul. 2021, pp. 178-191.

*Primary Examiner* — Stuart L Hendrickson
(74) *Attorney, Agent, or Firm* — Oblon, McClelland, Maier & Neustadt, L.L.P.

(57) ABSTRACT

A method for transforming atmospheric carbon dioxide ($CO_2$) into calcium carbonate on the surface of a desert includes spraying a composition consisting of calcium chloride ($CaCl_2$)) and ethylenediaminetetraacetic acid (EDTA) onto a top layer of sand of the desert and then drying the composition for 0.5 to 7 days. The composition does not penetrate beyond the top layer of sand and during the drying process atmospheric $CO_2$ is absorbed into the composition and reacts with the $CaCl_2$) to form a calcium carbonate precipitate. The calcium carbonate precipitate binds individual grains of sand together, forming a consolidated layer of sand, where the consolidated layer of has an average consolidated density in a range from 1.6 to 2.8 grams per cubic centimeter (g/cc).

20 Claims, 19 Drawing Sheets

TRANSFORMING ATMOSPHERIC CARBON DIOXIDE INTO CALCIUM CARBONATE

CROSS REFERENCE TO RELATED APPLICATIONS

This application is related to the application entitled METHOD FOR CONSOLIDATING TOP LAYER OF SAND ON GROUND SURFACE, which is incorporated herein by reference in its entirety.

The present disclosure claims the benefit of Saudi patent application Ser. No. 1020257621 filed on Oct. 15, 2025, with the Saudi Authority for Intellectual Property Office, which is incorporated herein by reference in its entirety.

STATEMENT OF ACKNOWLEDGEMENT

Support provided by the College of Petroleum and Geoscience, King Fahd University of Petroleum and Minerals, Saudi Arabia, is gratefully acknowledged.

BACKGROUND

Technical Field

The present disclosure is directed to a method for transforming atmospheric carbon dioxide ($CO_2$) into calcium carbonate on the surface of a desert.

Description of Related Art

The 'background' description provided herein is for the purpose of generally presenting the context of the disclosure. The work of the presently named inventors, to the extent it is described in this background section, as well as aspects of the description which may not otherwise qualify as prior art at the time of filing, are neither expressly nor impliedly admitted as prior art against the present disclosure.

The middle east and other arid regions around the world are known for their extreme heat, limited vegetation, and very little rainfall [Raffaele et al., Windblown sand action on civil structures: Definition and probabilistic modelling, *Eng. Struct.,* 2019, 178, 88-101]. Over time, people living in these harsh environments have developed smart ways to cope with the climate such as using appropriate building materials to reduce indoor heat and relying on technologies like air conditioning and desalination to manage water and temperature challenges. Despite these advances, sand and dust storms continue to be a major problem in the region. These storms are caused by strong winds that lift loose sand and dust from the ground, often traveling across long distances. They are most common in areas like the Arabian Plateau and the Tigris-Euphrates Basin, where the land is dry and exposed to wind erosion [Awadh, S., Impact of North African Sand and Dust Storms on the Middle East Using Iraq as an Example: Causes, Sources, and Mitigation, *Atmosphere* (*Basel*), 2023, 14, 180]. Seasonal patterns show that these storms happen most frequently in spring and summer, including in regions such as Al-Ahsa, Jazan, and Riyadh.

Sand and dust storms cause serious damage to the environment, infrastructure, and public health. They reduce soil fertility, pollute water sources, and damage roads, buildings, and machinery [Han, F., et al., Assessment of sand accumulation hazard on desert highway based on variable weight-cloud model theory, *Front. Earth Sci.,* 2023 11, 1-15]. Visibility drops during storms, increasing the risk of accidents and making transportation difficult. Health problems such as respiratory and cardiovascular issues are also linked to prolonged exposure to dust particles [Fussell, J., et al., Mechanisms underlying the health effects of desert sand dust, *Environ. Int.,* 2021 157, 106790].

Several methods have been used to try to reduce the impact of these storms. These include planting vegetation to block wind, building fences to catch drifting sand, and improving road designs to withstand sand buildup [Raffaele et al., Windblown sand action on civil structures: Definition and probabilistic modelling, *Eng. Struct.,* 2019, 178, 88-101; and Alghamdi, A., et al., Sand Control Measures and Sand Drift Fences, *J. Perform. Constr. Facil.,* 2005, 19, 295-299]. While helpful, these methods often require a great deal of water, money, and maintenance resources that are already limited in desert regions. Studies have also shown that increasing temperatures, rising $CO_2$ levels, and the lack of green cover are making the problem worse. Overall, sand and dust storms remain a persistent challenge in the Middle East. There is a strong need for new, practical, and environmentally friendly solutions that can reduce their impact in a more sustainable and cost-effective way. Rising atmospheric carbon dioxide levels contribute to the underlying causes of sand and dust storms, and additionally, reducing atmospheric carbon dioxide levels is a common worldwide goal to reduce global temperatures. Therefore, a method that could reduce atmospheric carbon dioxide, which would contribute to lowering global temperatures, as well as provide increased structural integrity to desert areas to resist sand and dust storms would be highly beneficial to the middle east and other arid regions around the world.

Accordingly, one object of the present disclosure is to provide an effective method of addressing the issue of sand and dust storms as well as reducing atmospheric carbon dioxide that may circumvent the drawbacks, such high cost and low efficiency, of the methods known in the art.

SUMMARY

In an exemplary embodiment, a method for transforming atmospheric carbon dioxide into calcium carbonate on a top layer of sand is described. The method includes spraying a composition including CaCl2, ethylenediaminetetraacetic acid (EDTA), and a gum selected from the group consisting of neem, gum Arabic, and combinations thereof onto the top layer of sand and drying the composition for 0.5 to 7 days to form a dried sand layer. The spraying an drying are repeated for at least 4 cycles. The top layer of sand has a depth of up to 50 mm, and the composition does not penetrate beyond the top layer of sand. Atmospheric CO2 is absorbed into the composition and reacts with the CaCl2 during drying to form a calcium carbonate precipitate in the dried sand layer. The calcium carbonate precipitate binds individual grains of sand together, thereby forming a consolidated layer of sand, and the consolidated layer of sand has an average consolidated density in a range from 1.6 to 2.8 grams per cubic centimeter (g/cc). In some embodiments, the composition includes from 1 to 35 weight % (wt. %) $CaCl_2$) and from 2.5 to 30 wt. % EDTA, based on the total weight of the composition.

In some embodiments, the composition includes from 5 to 30 wt. % $CaCl_2$) and from 5 to 25 wt. % EDTA, based on the total weight of the composition.

In some embodiments, the composition includes from 10 to 25 wt. % $CaCl_2$) and from 5 to 20 wt. % EDTA, based on the total weight of the composition.

In some embodiments, the composition includes from 10 to 20 wt. % $CaCl_2$), and from 10 to 20 wt. % EDTA, based on the total weight of the composition.

In some embodiments, the composition includes from 10 to 20 wt. % $CaCl_2$) and 15 wt. % EDTA, based on the total weight of the composition.

In some embodiments, the composition further includes a gum selected from the group consisting of neem, gum Arabic, and combinations thereof.

In some embodiments, the composition includes from 1 to 35 wt. % $CaCl_2$), from 1 to 20 wt. % of the gum, and from 2.5 to 30 wt. % EDTA, based on the total weight of the composition.

In some embodiments, the composition includes from 5 to 30 wt. % $CaCl_2$), from 5 to 15 wt. % of the gum, and from 5 to 25 wt. % EDTA, based on the total weight of the composition.

In some embodiments, the composition includes from 10 to 25 wt. % $CaCl_2$), from 7.5 to 12.5 wt. % of the gum, and from 5 to 20 wt. % EDTA, based on the total weight of the composition.

In some embodiments, the composition includes from 10 to 20 wt. % $CaCl_2$), from 7.5 to 12.5 wt. % of the gum, and from 10 to 20 wt. % EDTA, based on the total weight of the composition.

In some embodiments, the composition includes from 10 to 20 wt. % $CaCl_2$), 10 wt. % of the gum, and 15 wt. % EDTA, based on the total weight of the composition.

In some embodiments, the composition is produced by adding EDTA to wastewater.

In some embodiments, the top layer of sand includes sand grains with an average grain size in a range from 150 to 1200 micrometer (μm).

In some embodiments, the top layer of sand includes sand grains with an average grain size in a range from 300 to 1000 μm.

In some embodiments, the top layer of sand includes sand grains with an average grain size in a range from 500 to 900 μm.

In some embodiments, the temperature of the top layer of sand during drying is in a range from 25 to 60 degrees Celsius (° C.).

In some embodiments, the temperature of the top layer of sand during the drying is in a range from 35 to 50° C.

In some embodiments, the consolidated layer of sand has a depth in a range from 10 to 22 millimeters (mm). In some embodiments, the consolidated layer of sand has an average consolidated density in a range from 2.0 to 2.4 g/cc. The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
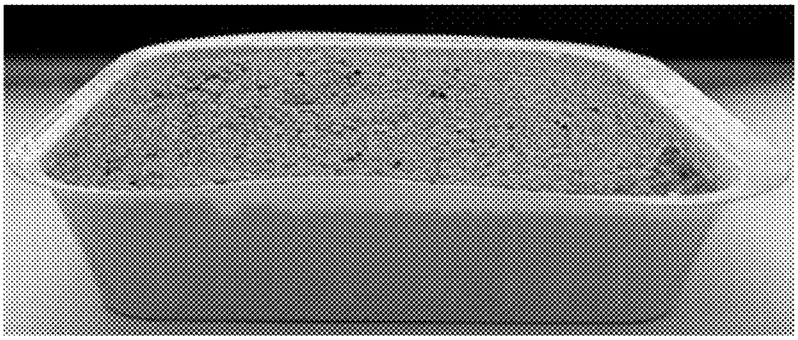
FIG. 1A is an image of consolidated samples in a plastic plate (5 wt. % $CaCl_2$) solution mixed with 15 wt. % ethylenediaminetetraacetic acid (EDTA) solution), according to certain embodiments.

When describing the present disclosure, the terms used are to be construed in accordance with the following definitions, unless a context dictates otherwise.

Embodiments of the present disclosure will now be described more fully hereinafter with reference to the accompanying drawings wherever applicable, in that some, but not all, embodiments of the disclosure are shown.

In the drawings, like reference numerals designate identical or corresponding parts throughout the several views. Further, as used herein, the words 'a,' 'an' and the like generally carry a meaning of 'one or more,' unless stated otherwise.

Furthermore, the terms 'approximately,' 'approximate,' 'about,' and similar terms generally refer to ranges that include the identified value within a margin of 20%, 10%, or preferably 5%, and any values therebetween.

As used herein, the term 'room temperature' refers to a temperature range of '23 degrees Celsius (° C.)±2° C. in the present disclosure. As used herein, 'ambient conditions' means the temperature and pressure of the surroundings in which the substance, composition or article is located.

In this application, a numerical value interval (i.e., a numerical value range) is involved, and, if not specifically stated, an optional numerical value distribution is considered continuous within the numerical value interval, and includes two numerical value endpoints (i.e., minimum and maximum values) of the numerical value range, and each numerical value between the two numerical value endpoints.

The temperature parameters in the present application, if not specifically limited, are both allowed to be constant temperature processing and allowed to be varied within a certain temperature interval. It should be understood that the constant temperature processing allows the temperature to fluctuate within the precision range of the instrument control. It is allowed to fluctuate in the range of, for example, 5 degrees Celsius (C), 4° C., 3° C., 2° C., 1° C.

A weight percent of a component, unless specifically stated to the contrary, is based on the total weight of the formulation or composition in which the component is included. For example, if a particular element or component in a composition or article is said to have 5 weight percent (wt. %), it is understood that this percentage is in relation to a total compositional percentage of 100%.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers.

As used herein, the term 'greenhouse effect' refers to the natural process by which certain gases in the earth's atmosphere such as carbon dioxide ($CO_2$), methane ($CH_4$), water vapor, and nitrous oxide ($N_2O$) absorb and re-radiate infrared radiation emitted from the earth's surface. This trapping of heat prevents the thermal energy from escaping into space, thereby warming the planet and maintaining temperatures that sustain life. While the greenhouse effect is required for life on earth, an enhanced greenhouse effect caused by increased concentrations of these gases due to human activities leads to global warming and climate change.

As used herein, the term 'absorption' refers to the process by which one substance is taken up into the interior or volume of another substance, such as a liquid or solid, resulting in the substance being uniformly distributed throughout the material.

As used herein, the term '$CO_2$ mineralization' refers to the process by which $CO_2$ is chemically converted and permanently stored in solid mineral forms through reactions with naturally occurring minerals, resulting in stable carbonate compounds. This process effectively captures and sequesters $CO_2$ from the atmosphere or industrial emissions, helping to reduce greenhouse gas concentrations and mitigate climate change.

As used herein the term 'soil consolidation' refers to the process by which soil gradually decreases in volume and increases in density due to the expulsion of water from its pores, typically under sustained load or pressure, or in the case of this disclosure, from chemical consolidation. This process results in the settlement and strengthening of the soil over time.

As used herein, the term 'average consolidation density' refers to the typical density of soil after it has been compressed, resulting in a more compact and stable soil.

As used herein, the term 'chelating agent' refers to a substance that binds tightly to metal ions, forming stable complexes that help control or remove these metals in various chemical or biological processes. For example, EDTA (ethylenediaminetetraacetic acid) is widely used in medicine to treat heavy metal poisoning by binding metals like lead and mercury. In water treatment, agents like polyphosphates prevent metal ions from forming scale deposits. Citric acid, a natural chelating agent, is used in food preservation and cleaning products to prevent discoloration and corrosion caused by metals. In agriculture, chelating agents such as DTPA (diethylenetriaminepentaacetic acid) help deliver useful nutrients like iron and zinc to plants, improving their growth and health.

As used herein the term 'natural binders' refers to substances derived from natural sources that are used to hold or bind materials together. These binders are typically biodegradable, environmentally friendly, and may include materials such as clay, starch, lignin, natural gums, and proteins.

As used herein, the term 'X-ray diffraction (XRD)' refers to an analytical technique used to identify the atomic and molecular structure of a crystalline material by measuring the way X-rays that are diffracted or scattered when they pass through the material. The resulting diffraction pattern provides information about the arrangement of atoms, phase identification, and crystallinity of the sample.

As used herein, the term 'scanning electron microscopy (SEM)' refers to an imaging technique that uses a focused beam of electrons to scan the surface of a sample, producing high-resolution, three-dimensional-like images that reveal detailed surface topography and composition. SEM allows for the examination of surface structures at micro to nanoscale levels.

Energy dispersive X-ray spectroscopy (EDX), often coupled with SEM, is an analytical technique used to determine the elemental composition of the sample. When the electron beam hits the sample, it emits characteristic X-rays unique to each element, which EDX detects and analyses to provide qualitative and quantitative information about the elements present in the area being examined.

As used herein, the term 'average particle size' refers to to the mean size of particles in a given sample, typically measured to represent the overall fineness or coarseness of the material.

As used herein, the term 'computed topography (CT)' refers to a medical imaging technique that uses X-rays taken from multiple angles around an object to create detailed cross-sectional images of internal structures.

Aspects of current disclosure are directed to a method for transforming atmospheric $CO_2$ into calcium carbonate on the surface of a desert. The present disclosure uses wastewater and atmospheric $CO_2$ for sand consolidation through mineralization, aiming to reduce sandstorm impacts while capturing $CO_2$ and repurposing waste.

A method for transforming atmospheric $CO_2$ into calcium carbonate on the surface of a desert is described. The order in which the method is described is not intended to be construed as a limitation, and any number of the described method steps can be combined to implement the method. Additionally, individual steps may be removed or skipped from the method without departing from the spirit and scope of the present disclosure.

The method includes spraying a composition including calcium chloride ($CaCl_2$)) and ethylenediaminetetraacetic acid (EDTA) onto a top layer of sand of the desert. In some embodiments, the composition can be produced by using alternative chelating agents such as citric acid, sodium citrate, nitrilotriacetic acid (NTA), gluconic acid, oxalic acid, tartaric acid, ethanolamine, lactic acid, or diethylenetriaminepentaacetic acid (DTPA). These agents can also chelate calcium ions from $CaCl_2$) rich brines and promote carbonate precipitation, with some offering advantages in terms of biodegradability, cost, or environmental impact. In a preferred embodiment, the composition is produced by adding EDTA to wastewater which effectively chelates calcium ions and enhances the formation of stable carbonates during $CO_2$ mineralization, resulting in improved sand consolidation performance.

In one or more embodiments, the spraying is achieved through any typical means, such as automated spraying with pumps, spraying through nozzles, spraying through atomizers, misting, centrifugal spraying, gravity feed spraying, electrostatic nozzles, ultrasonic nozzles, aerosol spraying, manual spraying, spraying through vehicular booms, hose spraying, and the like. In a preferred embodiment, spraying is achieved through pressure spraying with pumps and movable sprinkler nozzles.

In some embodiments, wastewater may include, but is not limited to, domestic sewage, greywater, blackwater, industrial effluent, textile dyeing effluent, pharmaceutical wastewater, food processing wastewater, paper mill effluent, tannery wastewater, dairy wastewater, brewery wastewater, petrochemical effluent, mining discharge, oil refinery wastewater, pesticide manufacturing wastewater, fertilizer plant effluent, landfill leachate, hospital wastewater, cosmetic industry effluent, paint manufacturing effluent, electroplating wastewater, battery manufacturing wastewater, metal finishing effluent, printing industry wastewater, distillery effluent, sugar mill wastewater, meat processing wastewater, poultry processing effluent, slaughterhouse wastewater, fishery industry wastewater, agricultural runoff, stormwater runoff, car wash water, cooling tower blowdown, boiler blowdown, power plant effluent, thermal plant discharge, laundry wastewater, residential greywater, construction site runoff, ceramic industry wastewater, electronics manufacturing effluent, semiconductor wastewater, detergent manufacturing wastewater, ink production effluent, lubricant manufacturing wastewater, adhesive production wastewater, plastic industry effluent, rubber industry wastewater, latex processing water, glass manufacturing wastewater, chemical manufacturing wastewater, fertilizer runoff, pesticide runoff, pharmaceutical wash water, biofuel production wastewater, biomass processing effluent, urban runoff, shipyard wastewater, leather processing effluent, concrete production wastewater, textile washing wastewater, food canning wastewater, beverage industry wastewater, vegetable oil processing effluent, palm oil mill effluent, olive oil mill wastewater, soft drink manufacturing wastewater, ice cream manufacturing wastewater, snack food processing wastewater, confectionery industry effluent, cheese production wastewater, yogurt manufacturing wastewater, tofu production wastewater, animal feed plant effluent, aquaculture discharge, composting leachate, and fruit juice processing wastewater. In a preferred embodiment, wastewater includes treatment plants that treat seawater, and the atmosphere serves as the source of $CO_2$.

In some embodiments, the composition includes from 0.5-60 weight % (wt. %) $CaCl_2$) preferably 1-35 wt. %, preferably 1.5-34.5 wt. %, preferably, 2-34 wt. %, preferably, 2.5-33.5 wt. %, preferably, 3-33 wt. %, preferably, 3.5-32.5 wt. %, preferably, 4-32 wt. %, preferably, 4.5-31 wt. %, preferably 5-30 wt. %, preferably 5.5-29.5 wt. %, preferably 6-29 wt. %, preferably 6.5-28.5 wt. %, preferably 7-28 wt. %, preferably 8-27 wt. %, preferably 9-26 wt. %, preferably 10-25 wt. %, preferably 10-23 wt. %, preferably 10-22 wt. %, preferably 10-20 wt. %, preferably 10.5-19.5 wt. %, preferably 11-19 wt. %, preferably 11.5-18.5 wt. %, preferably 12-18 wt. %, preferably 13-17 wt. %, preferably 14-16 wt. % and preferably 14.5-15.5 wt. % of $CaCl_2$) and from 0.5-50 wt. % EDTA, preferably 2.5-30 wt. %, preferably 3-29.5 wt. %, preferably 3.5-29 wt. %, preferably 4-28 wt. %, preferably 4.5-26 wt. %, preferably 5 to 25 wt. %, preferably 5-24 wt. %, preferably 5-23 wt. %, preferably 5-22 wt. %, preferably 5-21 wt. %, preferably 5-20 wt. %, preferably 6-20 wt. %, preferably 7-20 wt. %, preferably 8-20 wt. %, preferably 9-20 wt. %, preferably 10-20 wt. %, preferably 11-19 wt. %, preferably 12-18 wt. %, preferably 13-17 wt. %, preferably 14-16 wt. % EDTA, based on the total weight of the composition. In a preferred embodiment, the composition includes from 10 to 20 wt. % $CaCl_2$) and 15 wt. % EDTA, based on the total weight of the composition.

In some embodiments, the composition further includes a gum selected from the group consisting of neem, gum Arabic, and combinations thereof, where the composition includes different wt. % of $CaCl_2$), gum, and EDTA, based on the total weight of the composition.

In some embodiments, the gum may be selected from groups including but not limited to polyvinyl alcohol, polyethylene glycol, polyacrylic acid, polymethyl methacrylate, carboxymethyl cellulose, hydroxypropyl methylcellulose, polyvinylpyrrolidone, ethyl cellulose, carbomer, acrylamide copolymer, polyethylene oxide, poloxamer, silicone gum, polyether urethane, polyurethane resin, styrene-butadiene rubber, polyisobutylene, sodium carboxymethyl cellulose, hydroxyethyl cellulose, and methylcellulose. In a preferred embodiment, gum is selected from natural gums including neem, gum Arabic, and combinations thereof, although other natural gums may be used. Natural gums improve the overall strength and structural integrity of the consolidated samples, while $CO_2$ mineralization—which is aided by the interaction of CaCl2-rich brines and EDTA—causes the precipitation of stable carbonates that bond sand grains.

In some embodiments, the composition includes from 0.5-60 weight % (wt. %) $CaCl_2$) preferably 1-35 wt. %, preferably 1.5-34.5 wt. %, preferably 2-34 wt. %, preferably 2.5-33 wt. %, preferably 3-32 wt. %, preferably 4-31 wt. %, preferably 5-30 wt. %, preferably 5.5-29.5 wt. %, preferably 6-29 wt. %, preferably 7-34 wt. %, preferably 8-28 wt. %, preferably 9-27 wt. %, preferably 10-25 wt. %, preferably 10-23 wt. %, preferably 10-21 wt. %, preferably 10-20 wt. %, preferably 11-19 wt. %, preferably 14-18 wt. % and preferably 15-17 wt. %, from 0.5-30 wt. % of the gum, preferably 1-20 wt. %, preferably 1.5-19.5 wt. %, preferably 2-19 wt. %, preferably 2.5-18.5 wt. %, preferably 3-18 wt. %, preferably 3.5-17 wt. %, preferably 4-16 wt. %, preferably 5-15 wt. %, preferably 6-14 wt. %, preferably 7-13 wt. %, preferably 7.5-12.5 wt. %, preferably 8-12 wt. % and preferably 9-11 wt. %, and from 0.5-50 wt. % EDTA, preferably 2.5-30 wt. %, preferably 3-29 wt. %, preferably 3.5-27 wt. %, preferably 4-28 wt. %, preferably 5-25 wt. %, preferably 5-22 wt. %, preferably 5-21 wt. %, preferably 5-20 wt. %, preferably 6-20 wt. %, preferably 7-20 wt. %, preferably 8-20 wt. %, preferably 9-20 wt. %, preferably 10-20 wt. %, preferably 11-19 wt. %, preferably 12-18 wt. %, preferably 13-17 wt. % and preferably 14-16 wt. %, based on the total weight of the composition. In a preferred embodiment, the composition includes from 10-20 wt. % $CaCl_2$), 10 wt. % of the gum, and 15 wt. % EDTA, based on the total weight of the composition.

In some embodiments, the composition may penetrate beyond the top layer of the sand. In a preferred embodiment, the composition does not penetrate beyond the top layer of sand. In this context, the top layer of sand refers to the top 1 to 50 mm of sand, preferably the top 2 to 40 mm, preferably 3 to 30 mm, preferably 4 to 25 mm of sand.

The method includes drying the composition for 0.5 to 7 days to form a dried sand layer, and repeating the spraying and drying for at least 4 cycles. In some embodiments, the composition may be dried over a period ranging from 0.5 to 7 days using various drying methods. These may include air drying under ambient conditions, oven drying at controlled temperatures or vacuum drying under reduced pressure to facilitate moisture removal. Alternatively, the composition may be dried using a desiccator containing moisture-absorbing materials, or by exposure to natural sunlight in sun drying. In certain cases, infrared drying or forced convection drying with circulating air may also be employed to accelerate the drying process. In a preferred embodiment, the composition is dried using heating oven operated at 35-50° C. In another preferred embodiment, the composition is dried at ambient conditions in the desert, or at conditions similar to ambient conditions in a desert.

In some embodiments, the composition may dry for 0.25 to 10 days, preferably 0.5 to 7 days, preferably 1 to 7 days, preferably 2 to 7 days, preferably 3 to 6 days, preferably 3 to 5 days, preferably 4 to 5 days. In one or more embodiments, the spraying and drying is repeated for at least 2 cycles, preferably 4 cycles. In one or more embodiments, the spraying and drying is repeated for 1 to 100 cycles. In a preferred embodiment, the composition is dried for 1 day, and the spraying and drying is repeated for 4 cycles. During the drying period, atmospheric carbon dioxide ($CO_2$) is absorbed into the composition. The $CO_2$ reacts with the $CaCl_2$) component, resulting in the in-situ formation of calcium carbonate ($CaCO_3$) as a precipitate.

In some embodiments, the temperature of the top layer of sand during drying is in a range of from 15-100° C., preferably 25-60° C., preferably 26-59° C., preferably 27-58° C., preferably 28-57° C., preferably 29-56° C., preferably 30-55° C., preferably 31-54° C., preferably 32-53° C., preferably 33-52° C., preferably 34-51° C. and preferably 35-50° C. In a preferred embodiment, the top layer of sand during drying is 35-50° C.

In some embodiments, the top layer of sand includes sand grains with an average grain size in a range from 0.1 to 5000 μm, preferably 1 to 1500 μm, preferably 10 to 1500 μm, preferably 20 to 1500 μm, preferably 30 to 1500 μm, preferably 40 to 1500 μm, preferably 50 to 1500 μm, preferably 60 to 1500 μm, preferably 70 to 1500 μm, preferably 80 to 1500 μm, preferably 90 to 1500 μm, preferably 100 to 1500 μm, preferably 110 to 1500 μm, preferably 120 to 1500 μm, preferably 130 to 1500 μm, preferably 140 to 1500 μm, preferably 150 to 1500 μm, preferably 150 to 1400 μm, preferably 150 to 1300 μm, preferably 150 to 1200 μm, preferably 200 to 1200 μm, preferably 300 to 1200 μm, preferably 300 to 1100 μm, preferably 300 to 1000 μm, preferably 300 to 1000 μm, preferably 300 to 1000 μm, preferably 300 to 1000 μm, preferably 200 to 1000 μm, preferably 100 to 1000 μm, preferably 100 to 900 μm, preferably 100 to 800 μm, preferably 100 to 700 μm, preferably 100 to 600 μm, preferably 100 to 500 μm, preferably 100 to 400 μm, preferably 100 to 300 μm, preferably 100 to 200 μm, preferably 90 to 100 μm, preferably 50 to 100 μm, preferably 40 to 80 μm, preferably 10 to 30 μm, preferably 10 to 25 μm. In a preferred embodiment, the top layer of sand includes sand grains with an average grain size of 400 to 900 μm. In another preferred embodiment, the top layer of sand includes sand grains with an average grain size of about 20 μm.

In one or more embodiments, atmospheric $CO_2$ is absorbed into the composition and reacts with the $CaCl_2$) during drying to form a calcium carbonate precipitate in the dried sand layer. The calcium carbonate precipitate binds individual grains of sand together, thereby forming a consolidated layer of sand.

In some embodiments, the consolidated layer of sand has a depth in a range from 1 to 100 mm, preferably 3 to 45 mm, preferably 4 to 45 mm, preferably 5 to 45 mm, preferably 5 to 44 mm, preferably 5 to 43 mm, preferably 5 to 42 mm, preferably 5 to 41 mm, preferably 5 to 40 mm, preferably 6 to 40 mm, preferably 6 to 39 mm, preferably 6 to 38 mm, preferably 6 to 37 mm, preferably 6 to 36 mm, preferably 6 to 35 mm, preferably 8 to 25 mm, preferably 9 to 25 mm, preferably 10 to 25 mm, preferably 10 to 24 mm, preferably 10 to 23 mm, In a preferred embodiment, the consolidated layer of sand has a depth in a range of 10.16 to 22.37 mm.

In some embodiments, the consolidated layer of sand has an average consolidated density in a range from 1.0 to 3.8 g/cc, preferably 1.6 to 2.8 g/cc, preferably 1.7 to 2.8 g/cc, preferably 1.8 to 2.8 g/cc, preferably 1.8 to 2.7 g/cc, preferably 1.8 to 2.6 g/cc, preferably 1.9 to 2.6 g/cc, preferably 1.9 to 2.5 g/cc, preferably 1.9 to 2.5 g/cc, preferably 2.0 to 2.6 g/cc, preferably 2.0 to 2.5 g/cc, preferably 2.0 to 2.4 g/cc, preferably 2.1 to 2.4 g/cc, preferably 2.1 to 2.3 g/cc.

The following examples are provided solely for illustration and are not to be construed as limitations of the present disclosure, as many variations thereof are possible without departing from the spirit and scope of the present disclosure.

EXAMPLES

The following examples demonstrate a method for transforming atmospheric carbon dioxide ($CO_2$) into calcium carbonate on the surface of a desert. The examples are provided solely for illustration and are not to be construed as limitations of the present disclosure, as many variations thereof are possible without departing from the spirit and scope of the present disclosure.

Example 1: Method for Sand Preparation and Atmospheric $CO_2$ Conversion

Brine solutions at different concentrations were prepared using ACS reagent grade calcium chloride ($CaCl_2$)) salt supplied by Sigma-Aldrich. The average particle size of the sand used was approximately 20 micrometers, and the sand was collected from Half Moon Beach, Dhahran, Saudi Arabia. A chelating agent, ethylenediaminetetraacetic acid (EDTA), also supplied by Sigma-Aldrich, was used as received without further purification for mineralization assessment. Two scenarios were examined. In the first scenario, sand was consolidated using brines containing high concentrations of cations. In the second scenario, sand was consolidated by combining brine treatment with direct adsorption of carbon dioxide ($CO_2$) from the atmosphere (Mohammed, I., et al., A complementary eco-friendly approach to heavy metal removal from wastewater/produced water streams through mineralization, *J. Environ. Chem. Eng.,* 2024 12, 113939, which is incorporated herein by reference in its entirety). The brine in the first case does not contain any EDTA solution.

A quantity of 325 grams of sand was placed in a rectangular plastic plate to evaluate the propensity of $CO_2$ mineralization to solidify sand particles and form a hardened topsoil layer. The samples were labelled appropriately and evenly distributed to fill the surface of the plate. Further, the samples were treated with various prepared solutions. In the initial cases, calcium chloride ($CaCl_2$)) solutions at concentrations of 1 weight percentage (wt. %), 2 wt. %, 3 wt. %, 5 wt. %, 7.5 wt. %, and 10 wt. % were sprayed onto the top layer of the sand using a portable spray bottle. The above-described procedure was intended to simulate a sprinkler system in which solution is applied to dune surfaces or the upper sand layer without reaching the deeper strata. Oversaturation was avoided, as dunes may reach heights of 150 to 200 meters, and the solution application was restricted to the surface layer.

After spraying, the treated samples were placed in an oven maintained at a temperature between 35° C. and 50° C., simulating average environmental conditions in the Middle East, particularly in Saudi Arabia. The samples were sprayed once per morning for a period of four days and were left undisturbed during that time. At the designated temperature conditions, the samples gradually absorbed atmospheric carbon dioxide, and the topsoil layer hardened. Further, the procedure was repeated using new samples, in which a 5 wt. % solution of ethylenediaminetetraacetic acid (EDTA) was combined with $CaCl_2$) at concentrations of 5 wt. %, 7.5 wt. %, and 10 wt. %, and the mixture was administered as previously described. After four days, the consolidated samples were evaluated by visual inspection. Conventional methods for determining surface hardness, including spot surface hardness testing and scratch testing as per Auto-Scan New England Research Inc. protocols, were found to be unsuitable because the procedures caused breakage of the consolidated samples without yielding reliable measurements. Evaluation of the consolidated samples was performed using X-ray powder diffraction (XRD), scanning electron microscopy (SEM), microcomputed tomography (Micro CT), and medical CT analysis.

The previously described procedure was repeated at a larger scale using a wider container. At this scale, lower concentrations were found to yield insufficient surface hardness. Therefore, concentrations of 10 wt. % and 20 wt. % $CaCl_2$) and 15 wt. % EDTA were employed. In addition, natural polymers including neem gum and gum Arabic were added at 5 wt. % each. The consolidated surface was then re-evaluated. The polymers were introduced to enhance surface hardness and reduce penetration depth of the brine into the sand layer, decreasing the volume of fluid required. The carbon dioxide used for all consolidation processes was from ambient atmospheric air.

Powder x-ray diffraction (PXRD) analysis was performed to determine the bulk mineralogy of the samples using a Malvern PANalytical XRD apparatus equipped with a copper (Cu) source. Each sample was ground into a fine powder using a Retsch RM 200 mill, with each pulverization cycle lasting between five and seven minutes to provide a uniform particle size distribution. The powdered samples were analysed over a 2θ range of 4° to 70°, using a step size of 0.013°. The obtained XRD data were post-processed using the Highscore Plus software, version 4.9.

Twelve post-experiment samples were examined using a Gemini 450 scanning electron microscope (SEM), which was outfitted with a Bruker Quantax energy dispersive X-ray (EDX) spectrometer and a backscattered electron detector. Prior to SEM analysis, the stub-mounted samples were coated with a 30 nm thick layer of gold-palladium using a Quorum QR150R sputter coater. The coated samples were analysed under SEM at an accelerating voltage of 15 kV and a probe current of 166 pA, with a working distance ranging from 8 mm to 15 mm. Nine of the thirty-four recovered precipitate samples were selected for SEM investigation, as morphological consistency was observed across multiple specimens. In addition to SEM analysis, XRD was conducted to evaluate the mineralogical composition of the recovered material.

Medical computed tomography (CT) analysis was carried out using Toshiba's Alxion CT system, operated in conjunction with the VoxelCalc-X software. The experimental samples were secured within the field of view of the scanner to provide stability during the imaging procedure. The CT system emitted X-rays, which were attenuated as they passed through the sample to produce high-resolution cross-sectional images. The obtained images were reconstructed into a three-dimensional model using VoxelCalc-X, which also enabled density and volumetric analyses to be performed. Prior to imaging, calibration of the software and scanner was performed to provide accurate measurement and image clarity, thereby facilitating precise assessment of the physical characteristics of the sample.

For microcomputed tomography (micro-CT) analysis, a ZEISS micro-CT system was employed to generate high-resolution three-dimensional images of cleaved consolidated topsoil samples. Each sample was securely mounted on the rotation stage, and the scan parameters including voltage, current, and exposure time, were adjusted based on the composition of the sample to enhance resolution. As the sample was rotated through 360 degrees, a series of two-dimensional X-ray projections were collected to capture the internal features of the sample. The collected data were reconstructed into a 3D volume using Dragonfly software, which enabled advanced segmentation and quantitative analysis. Using built-in measurement tools in Dragonfly, structural parameters such as porosity and density were analysed, providing detailed insights into the internal morphology of the consolidated samples.

Before presenting the experimental findings, several considerations related to the field-level implementation of the disclosed technology were established. As previously described, it was understood that a combination of strategies needed to be employed concurrently to reduce wind speed and to suppress the entrainment of sand particles in order to address sandstorm-related challenges. The consolidation of sand particles at locations several kilometers away from sandstorm hotspots was determined to be a viable method for preventing the impact of sand transport on infrastructure, even though vegetation served to reduce wind velocity. Additionally, it was observed that, unlike vegetation and fencing structures, which are economically unfeasible to deploy over large distances, the sand consolidation approach may be implemented at remote locations relative to the protection zones. The method employed in the present disclosure utilized wastewater containing high concentrations of divalent cations. Accordingly, the wastewater constituted a cost-effective resource that was repurposed to mitigate an environmental concern. Furthermore, the approach employed ambient atmospheric $CO_2$ as a reactant, thereby contributing to the objective of reducing the adverse effects associated with carbon emissions.

Figure 1B:
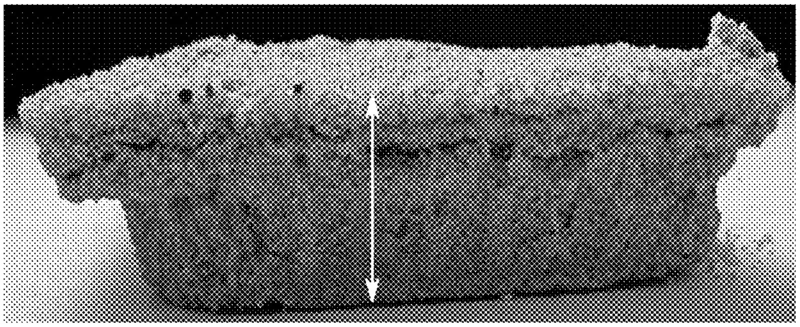
FIG. 1B is an image of consolidated samples without a plastic plate (5 wt. % $CaCl_2$) solution mixed with 15 wt. % EDTA solution), according to certain embodiments.
Figure 1C:
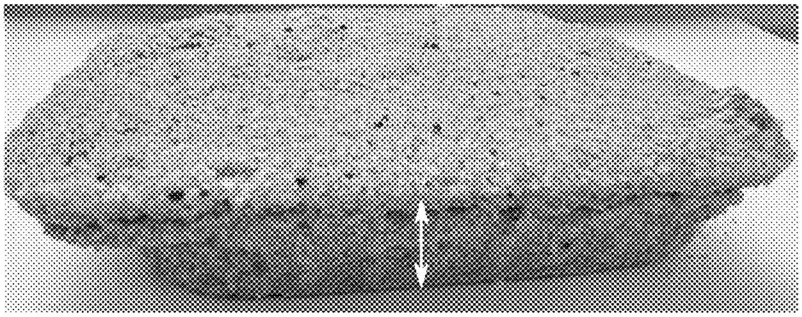
FIG. 1C is an image of consolidated samples without a plastic plate (5 wt. % $CaCl_2$) solution mixed with 15 wt. % EDTA solution), according to certain embodiments.
Figure 1D:
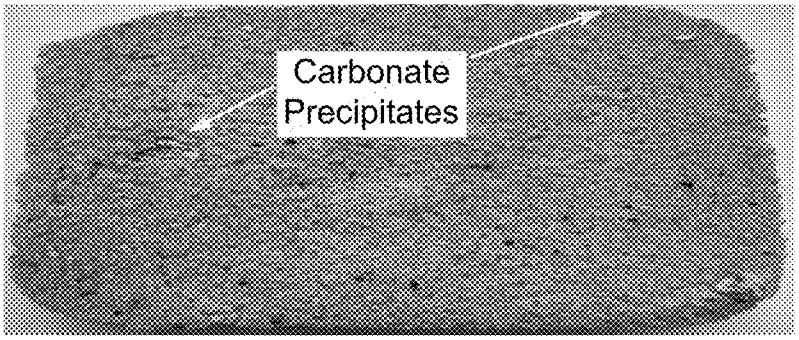
FIG. 1D is an image of consolidated samples with top-view showing carbonate precipitates (5 wt. % $CaCl_2$) solution mixed with 15 wt. % EDTA solution), according to certain embodiments.

To physically examine the samples, they were carefully removed from the plastic plates and manually examined to observe the extent of consolidation. This hands on evaluation helps determine how deeply the sand particles are bound together within the soil. Additionally, it provides insight into the strength of the consolidated surfaces, allowing for a better assessment of the consolidation quality. Consolidated samples of a 5 wt. % $CaCl_2$) solution combined with a 15 wt. % EDTA solution are displayed in FIG. 1. In 1A, the sample is displayed within the plastic plates utilized for the experiment; however, in FIG. 1B through FIG. 1D, the sample has been taken out to assess the level of consolidation. Using a vernier caliper, the depth of consolidation was determined from FIGS. 1B-1C to be between 10.16 and 22.37 mm for several samples. Furthermore, carbonate precipitates are visible in FIG. 1D. XRD analysis revealed that these were made of aragonite and calcite.

Figure 2A:
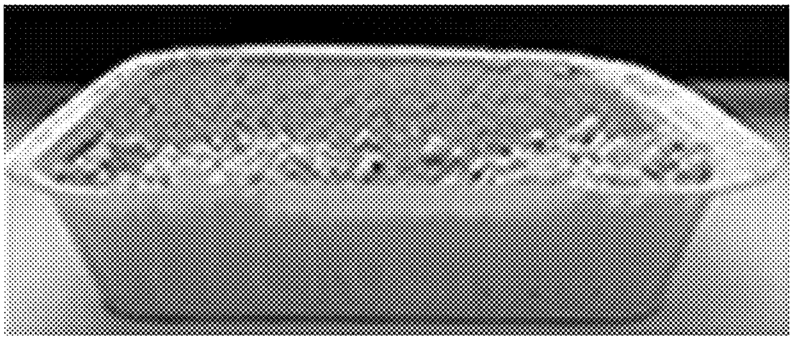
FIG. 2A shows an image of consolidated samples in a plastic plate (7.5 wt. % $CaCl_2$) solution mixed with 15 wt. % EDTA solution), according to certain embodiments.
Figure 2B:
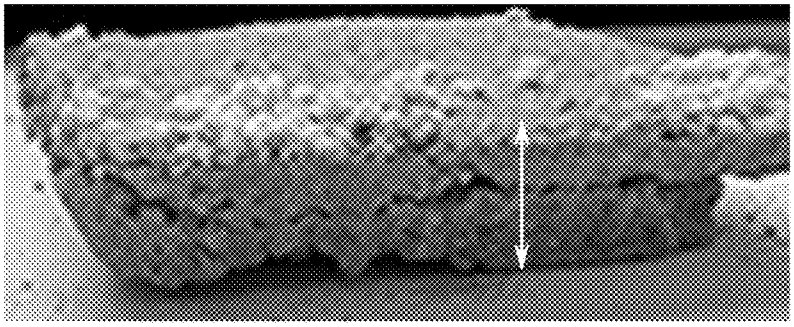
FIG. 2B is an image of consolidated samples without a plastic plate showing the depth of consolidation (7.5 wt. % $CaCl_2$) solution mixed with 15 wt. % EDTA solution), according to certain embodiments.
Figure 2C:
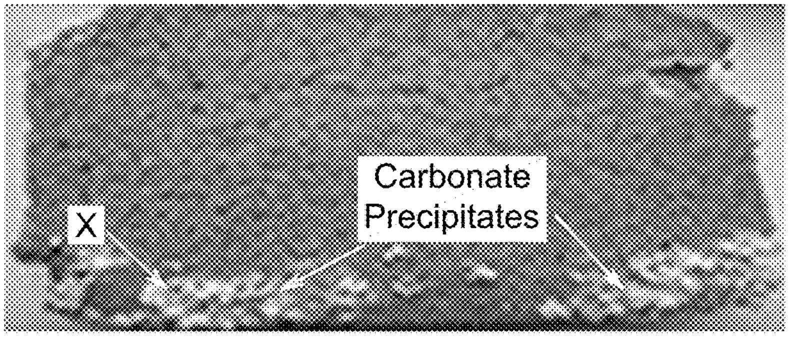
FIG. 2C is an image showing the presence of precipitates on the sample (7.5 wt. % $CaCl_2$) solution mixed with 15 wt. % EDTA solution), according to certain embodiments.
Figure 2D:
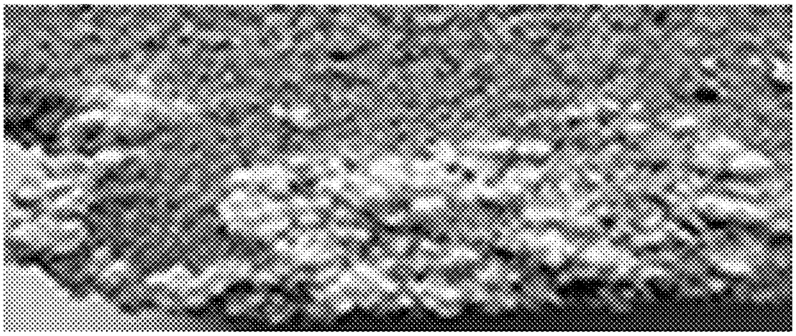
FIG. 2D is a magnified image of consolidated samples showing the presence of precipitates on the surface (7.5 wt. % $CaCl_2$) solution mixed with 15 wt. % EDTA solution), according to certain embodiments.

The conclusion that the solution mixture absorbs $CO_2$ from the environment to generate carbonate employed in the sand consolidation is supported by the existence of carbonates in the samples, which act as a cementing material for the sand particles. Samples with higher $CaCl_2$) (7.5-10 wt. %) were investigated to assess the impact of utilizing higher $CaCl_2$) and its affect on consolidation. The use of 7.5 wt. $CaCl_2$) and 15 weight percent EDTA solution is depicted in FIG. 2. More carbonate is generated in the case of 7.5-weight percent $CaCl_2$) (FIG. 2) as compared to the 5 wt. % percent $CaCl_2$) solution (FIG. 1). The sample is shown in the experimental plastic plate (FIG. 2A), much like in FIG. 1A, and then it is taken out for evaluation in FIGS. 2B-2C. While the entire sample surface is consolidated, FIGS. 2B-2C shows that the carbonate produced is localized at the edges. To further show the precipitates generated at the edges, FIG. 2D magnifies the spot indicated by X in FIG. 2C. Like the 5% instance (FIG. 1), the atmosphere is the source of $CO_2$, and calcite and aragonite predominate in the precipitates. The two figures (FIG. 1 and FIG. 2) shown thus far demonstrate how the method outlined in this study tends to stabilize sand particles and inhibit lifting due to wind movement. Furthermore, it proved that varied brine concentrations as low as 5 weight percent, which is routinely obtained from wastewater treatment plants, can be used. This method also reduces carbon levels in the atmosphere and repurposes wastewater.

Figure 3:
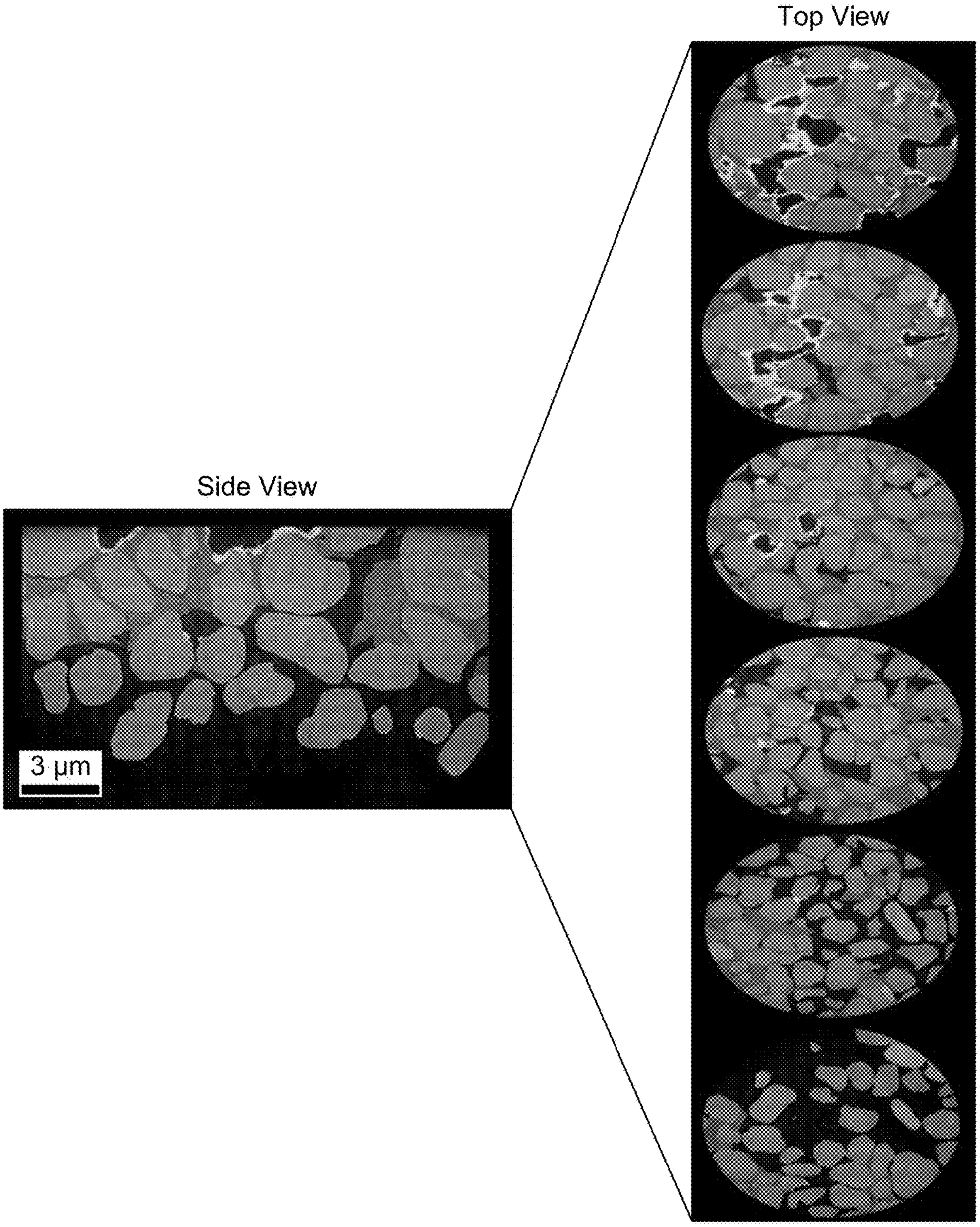
FIG. 3 is an image showing micro-computed topography (CT) analysis of cleaved consolidated sand top at 3 micrometer (μm) scale, according to certain embodiments.
Figure 4:
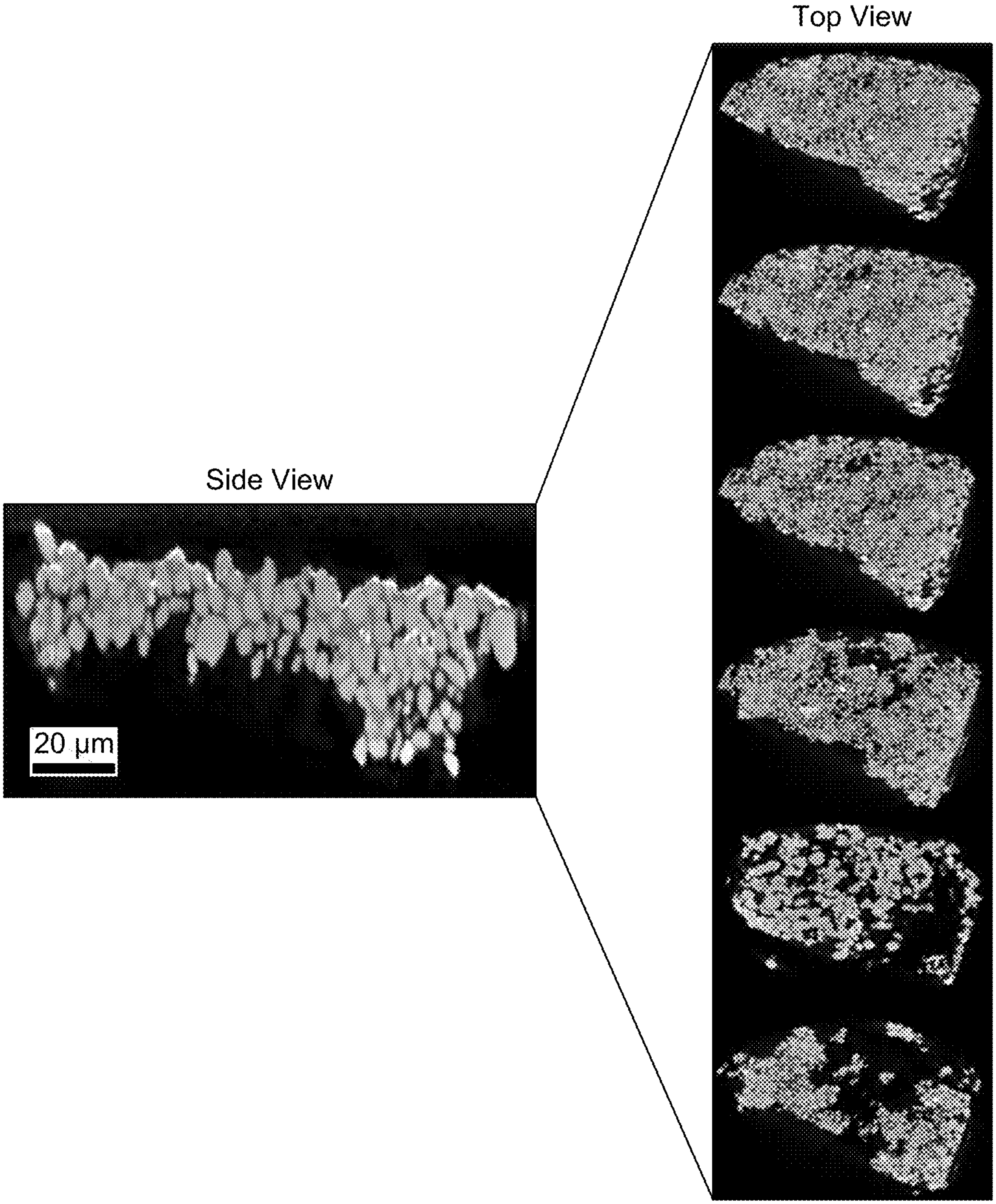
FIG. 4 is an image showing micro-CT analysis of cleaved consolidated sand top at 3 μm scale, according to certain embodiments.
Figure 5A:
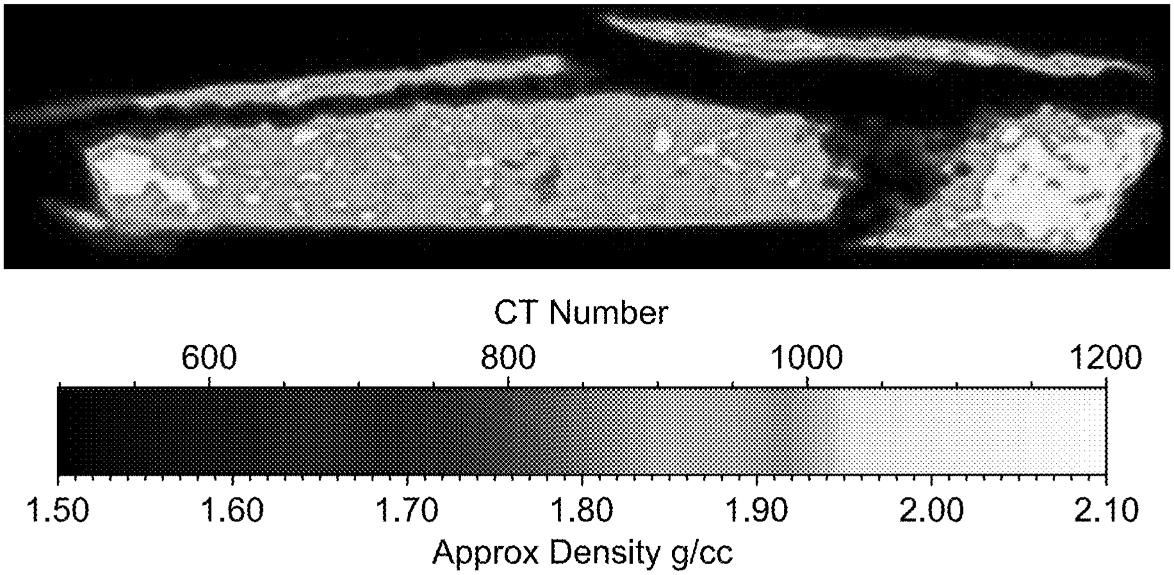
FIG. 5A is a medical-CT image of consolidated samples (5 wt. % $CaCl_2$) and 10 wt. % EDTA), according to certain embodiments.
Figure 5B:
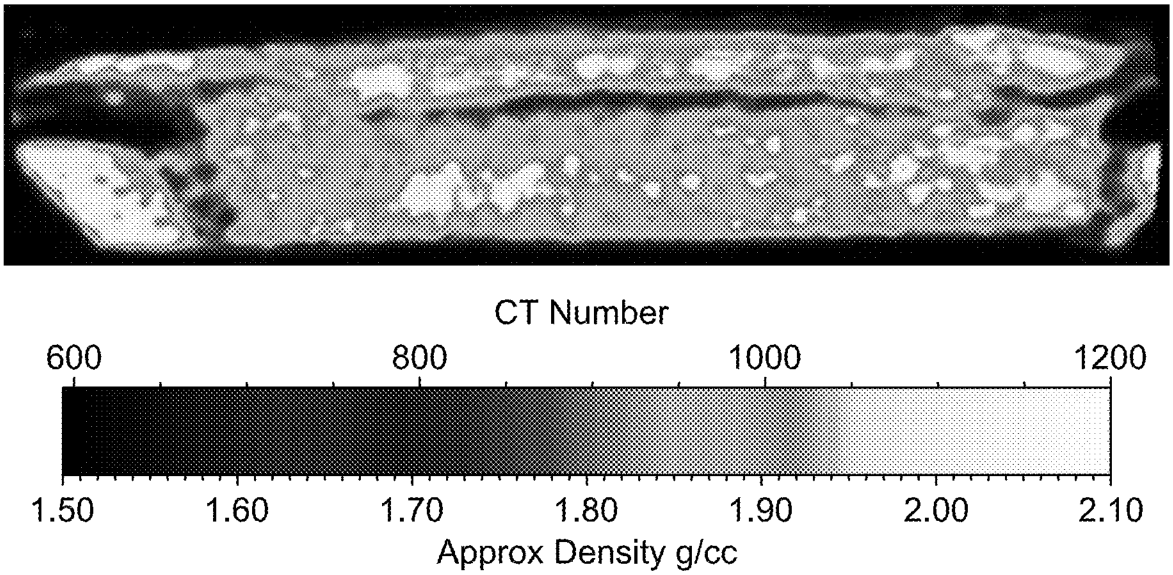
FIG. 5B is a medical-CT image of consolidated samples (5 wt. % $CaCl_2$) and 15 wt. % EDTA), according to certain embodiments.
Figure 5C:
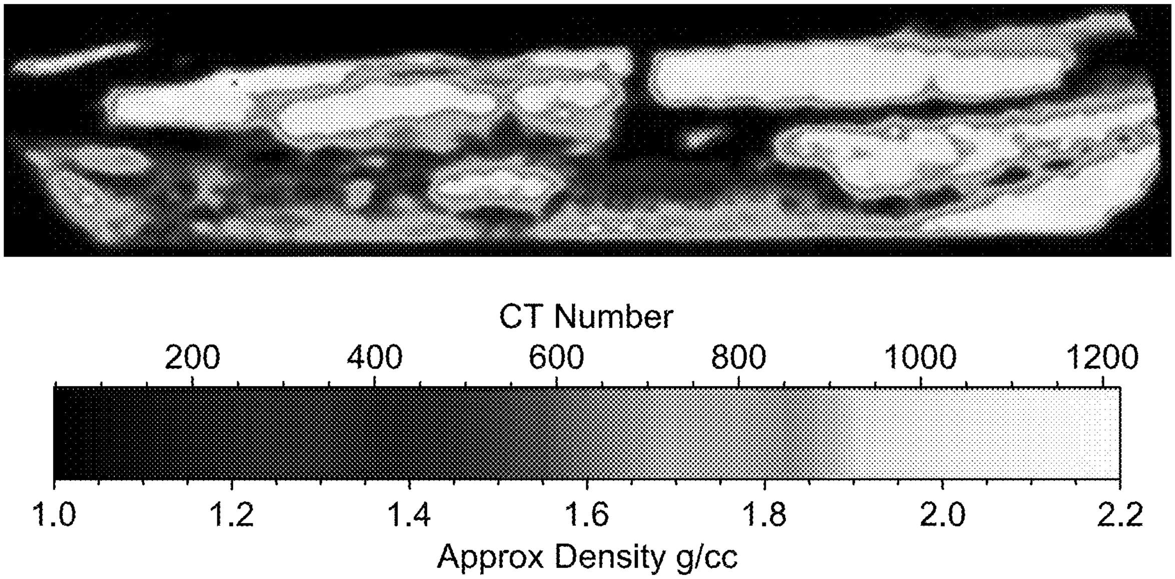
FIG. 5C is a medical-CT image of consolidated samples (7.5 wt. % $CaCl_2$) and 10 wt. % EDTA), according to certain embodiments.
Figure 5D:
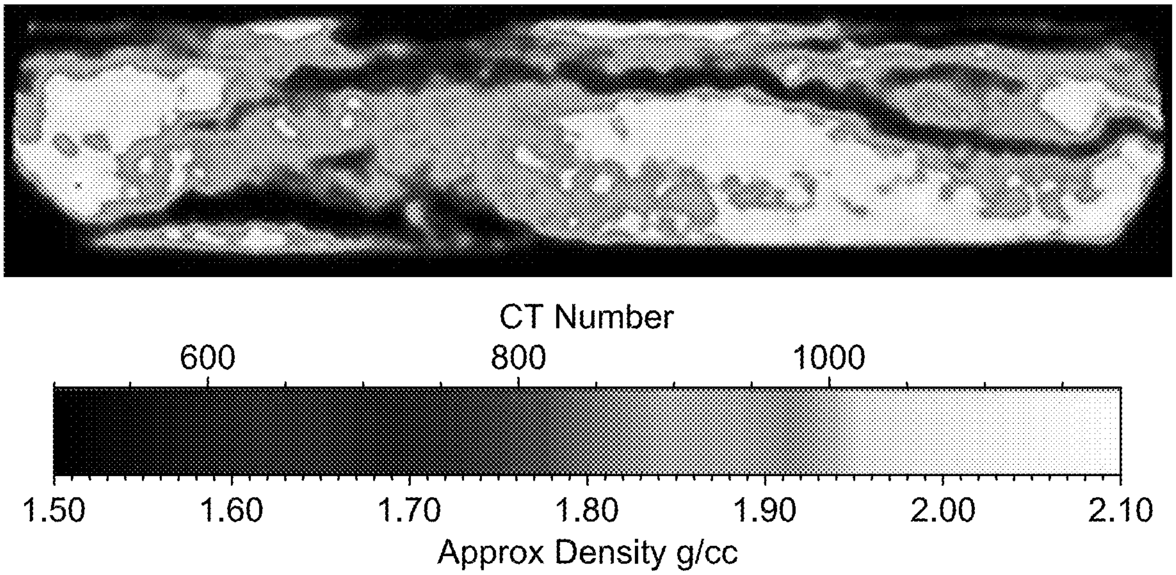
FIG. 5D is a medical-CT image of consolidated samples (7.5 wt. % $CaCl_2$) and 15 wt. % EDTA), according to certain embodiments.
Figure 5E:
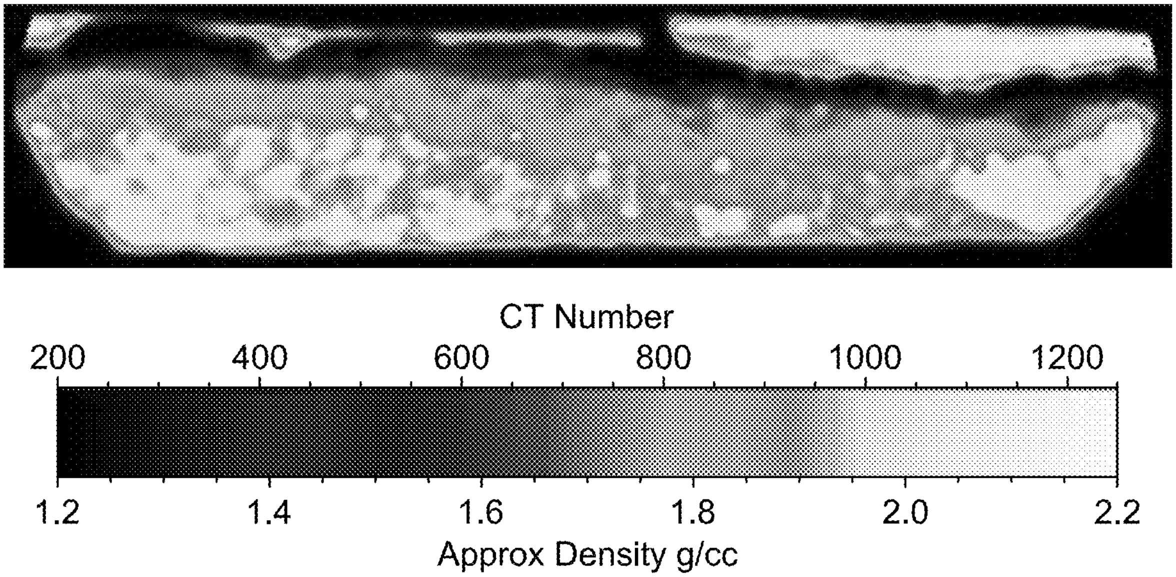
FIG. 5E is a medical-CT image of consolidated samples (10 wt. % $CaCl_2$) and 10 wt. % EDTA), according to certain embodiments.
Figure 5F:
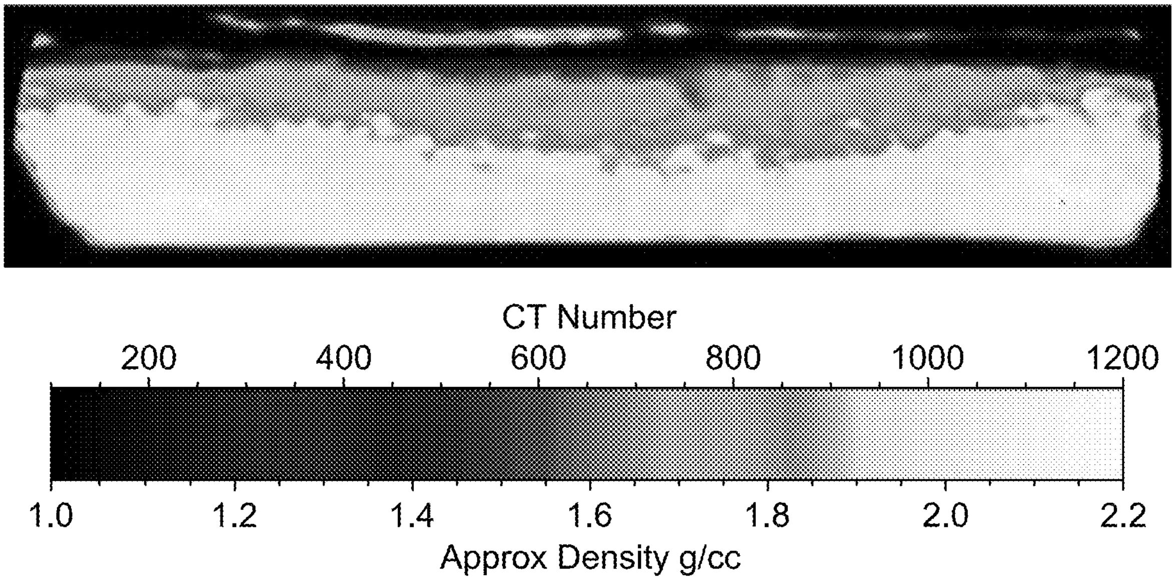
FIG. 5F is a medical-CT image of consolidated samples (10 wt. % $CaCl_2$) and 15 wt. % EDTA), according to certain embodiments.
Figure 6A:
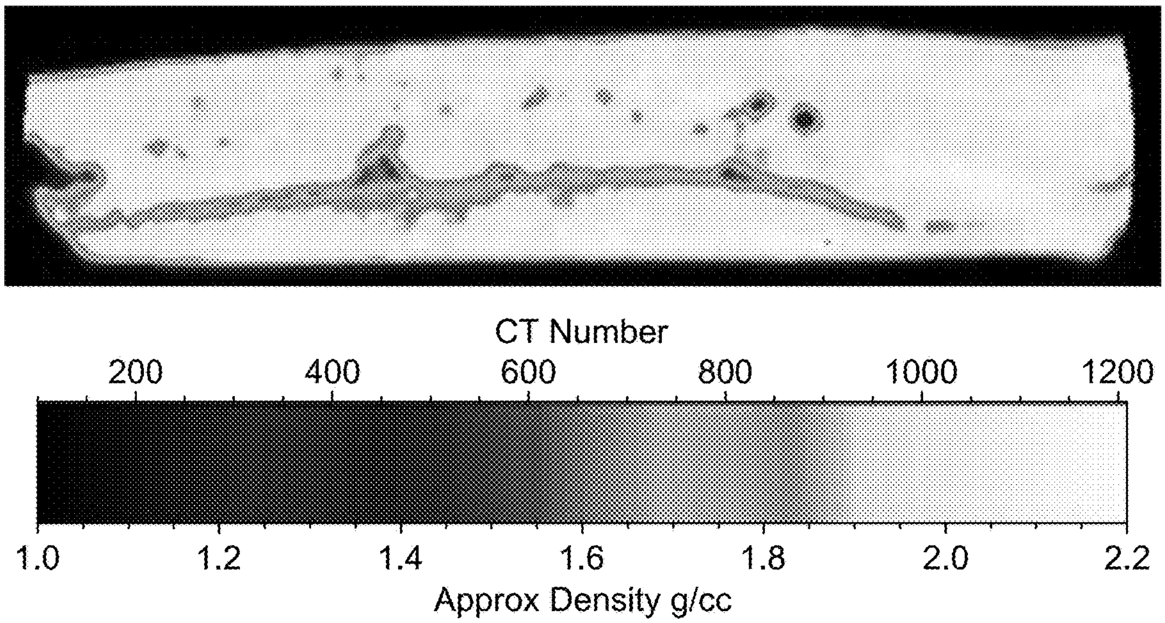
FIG. 6A is a medical-CT image of consolidated samples using 1 wt. % $CaCl_2$) solution without EDTA, according to certain embodiments.
Figure 6B:
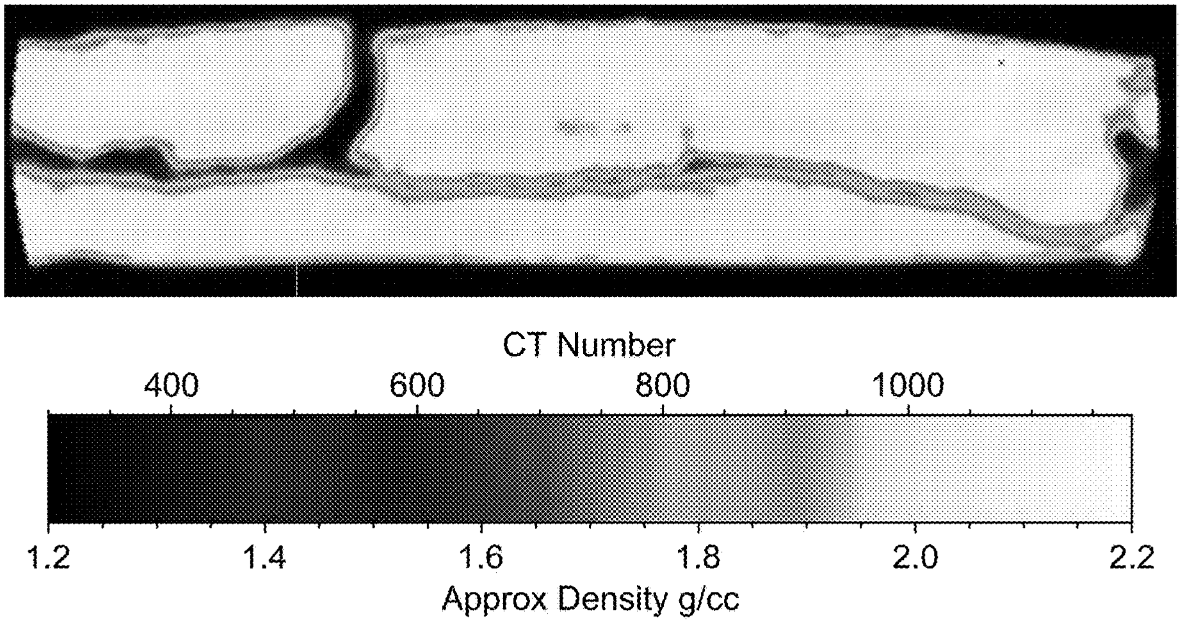
FIG. 6B is a medical-CT image of consolidated samples using 2 wt. % $CaCl_2$) solution without EDTA, according to certain embodiments.
Figure 6C:
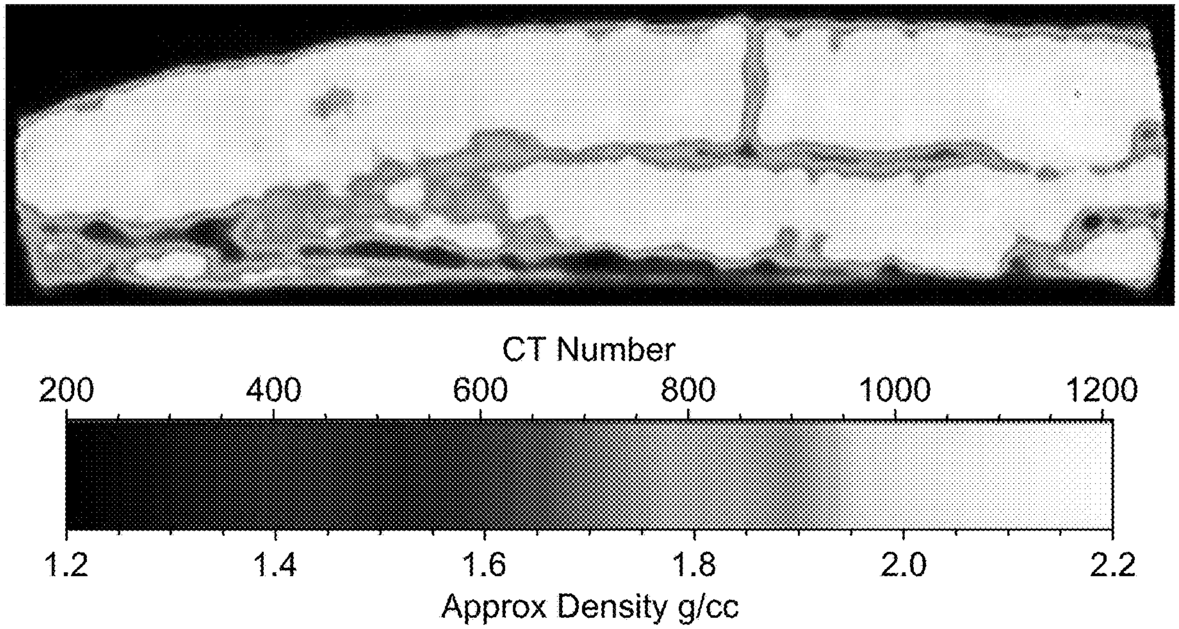
FIG. 6C is a medical-CT image of consolidated samples using 3 wt. % $CaCl_2$) solution without EDTA, according to certain embodiments.
Figure 6D:
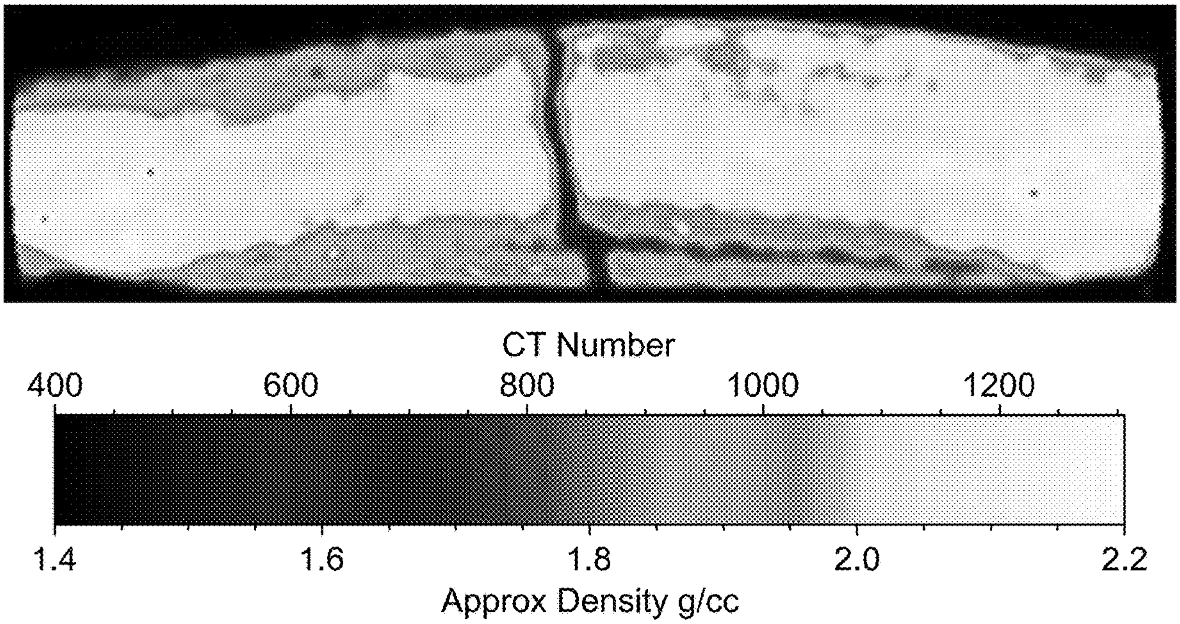
FIG. 6D is a medical-CT image of consolidated samples using 5 wt. % $CaCl_2$) solution without EDTA, according to certain embodiments.
Figure 6E:
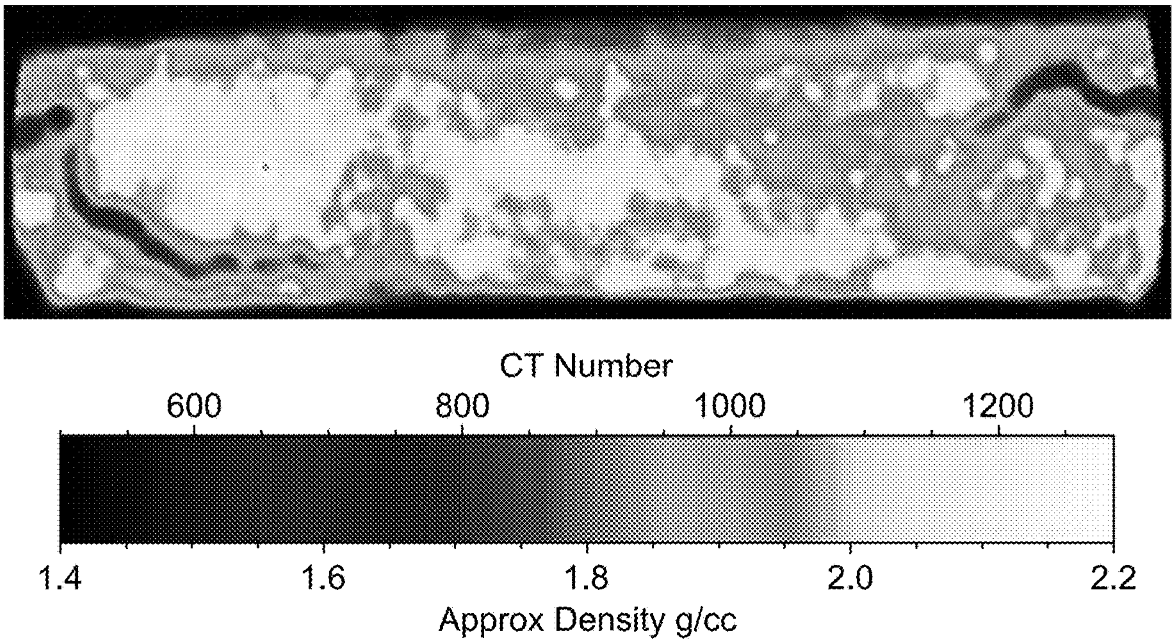
FIG. 6E is a medical-CT image of consolidated samples using 7.5 wt. % $CaCl_2$) solution without EDTA, according to certain embodiments.
Figure 6F:
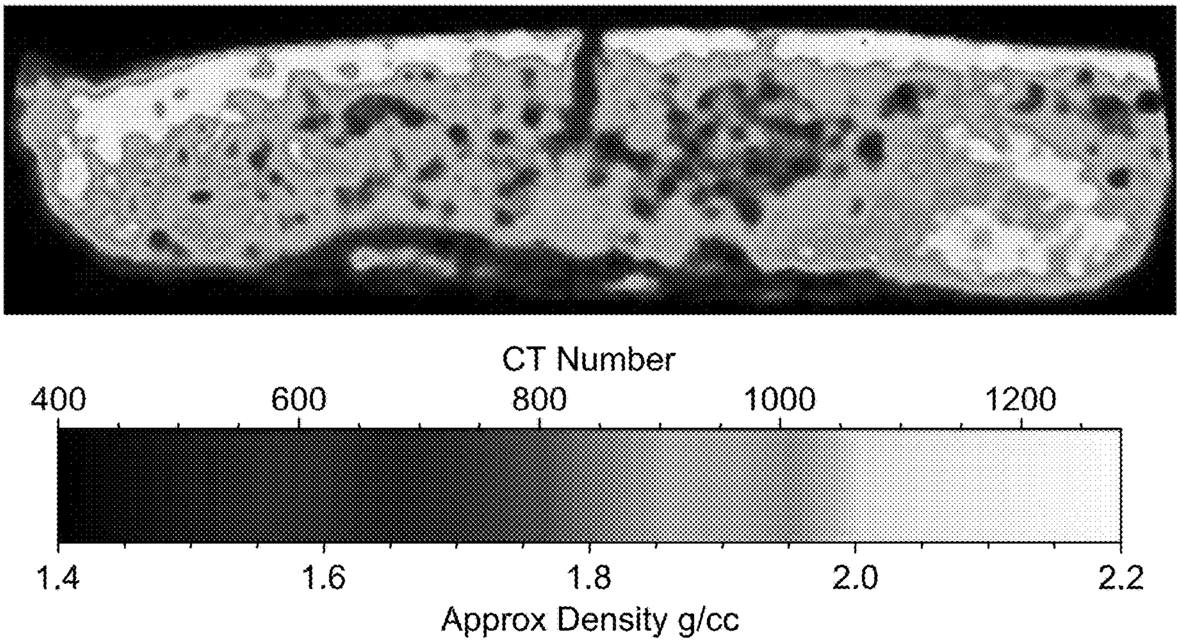
FIG. 6F is a medical-CT image of consolidated samples using 10 wt. % $CaCl_2$) solution without EDTA, according to certain embodiments.

A micro-CT study of cleaved consolidated topsoil was carried out to investigate the top layer of consolidated samples. This was done twice to understand the surface morphology at different scales (3 and 20 micrometer (μm)). Furthermore, this sheds light on the degree of consolidation and the possibility of residual permeability following consolidation. The micro-CT analysis of the cleaved sample tops at two distinct scales of 3 and 20 μm is displayed in FIG. 3 and FIG. 4. It is evident from both figures that the top layer of the sample is consolidated, leaving some pores between the grains. On the other hand, the degree of consolidation decreases as the depth increases. This indicates that the soil is not cemented effectively past a certain distance from the soil surface, further preserving the soil's natural state. Additionally, this demonstrates a selective and controlled consolidation process because the consolidated top layer creates a barrier that lessens sand erosion and the lifting of dust particles into the atmosphere, particularly during strong winds, which controls sand and dust. Meanwhile, the sand's inherent qualities (presence of pores) which permit water infiltration are preserved in the deeper layers, which still have a naturally porous structure. Because of this, rainwater can still be absorbed by the treated area, avoiding runoff, improving groundwater recharge, and encouraging vegetation development, all of which contribute to stabilization of the soil. The method described in this study provides a sustainable way to enhance sand cohesion without sacrificing its ecological qualities from an environmental point of view. The technique tackles both the immediate issue of dust storms and long-term land degradation since it may stabilize the surface while maintaining permeability below. Additionally, it removes carbon dioxide from the atmosphere while improving the quality of the sand by strengthening the sand surface structure, which increases its resistance to erosion while preserving its natural qualities which enhance the health of nearby ecosystems. Because of this dual purpose, the technique is useful in areas where dust storms and desertification are common, which are typically most affected by increasing carbon dioxide levels.

The medical CT examination provides a considerably more comprehensive view of the samples in terms of the fraction that is consolidated and the depth of consolidation, whereas the micro-CT (FIGS. 3-4) examination offers a close-up look at the sample surface at a resolution of 3 and 20 μm. Seeing how the sample strata fluctuate in terms of the samples' mineralogical composition following consolidation, which is demonstrated by variations in the samples' densities and CT numbers, is also beneficial. The medical CT examination of the consolidated samples employing EDTA (10 and 15 wt. %) and $CaCl_2$) solution at various concentrations (5, 7.5, and 10 wt. %) are displayed in FIG. 5. FIGS. 5A through 5F demonstrate how the samples have been consolidated based on density and CT number contrast. This demonstrates that, in certain situations, the base of the sample retains its original state while the top-soil layer is consolidated. The fractures seen in the figures are the result of unsuccessful attempts to evaluate surface hardness using the Autoscan device. The surface of the samples is therefore perfectly cemented before the harness test attempts. In addition to using EDTA, a temperature-sensitive method was assessed. This method exclusively uses brine that is high in divalent cations. FIG. 6 displays the results of the medical-CT scan performed on samples that were treated with 1, 2, 3, 5, 7.5, and 10 wt. % $CaCl_2$) and left undisturbed at temperatures of 35 to 50° C. The results show that the samples can also be consolidated using just the brine; however, in this case, there is little $CO_2$ absorption from the environment. Furthermore, this method is only effective above 35° C. As a result, the samples return to their loose form once the warmth is removed and allowed to cool. This indicates that this strategy can only be used in the summer or areas with high temperatures. Thus, the samples revert to their loose form in the winter. Furthermore, this approach is applicable in the summer when sandstorm issues are more common. Therefore, the two solutions are different in that one absorbs $CO_2$ from the atmosphere and needs EDTA, while the other is temperature-sensitive and is EDTA free.

Figure 7A:
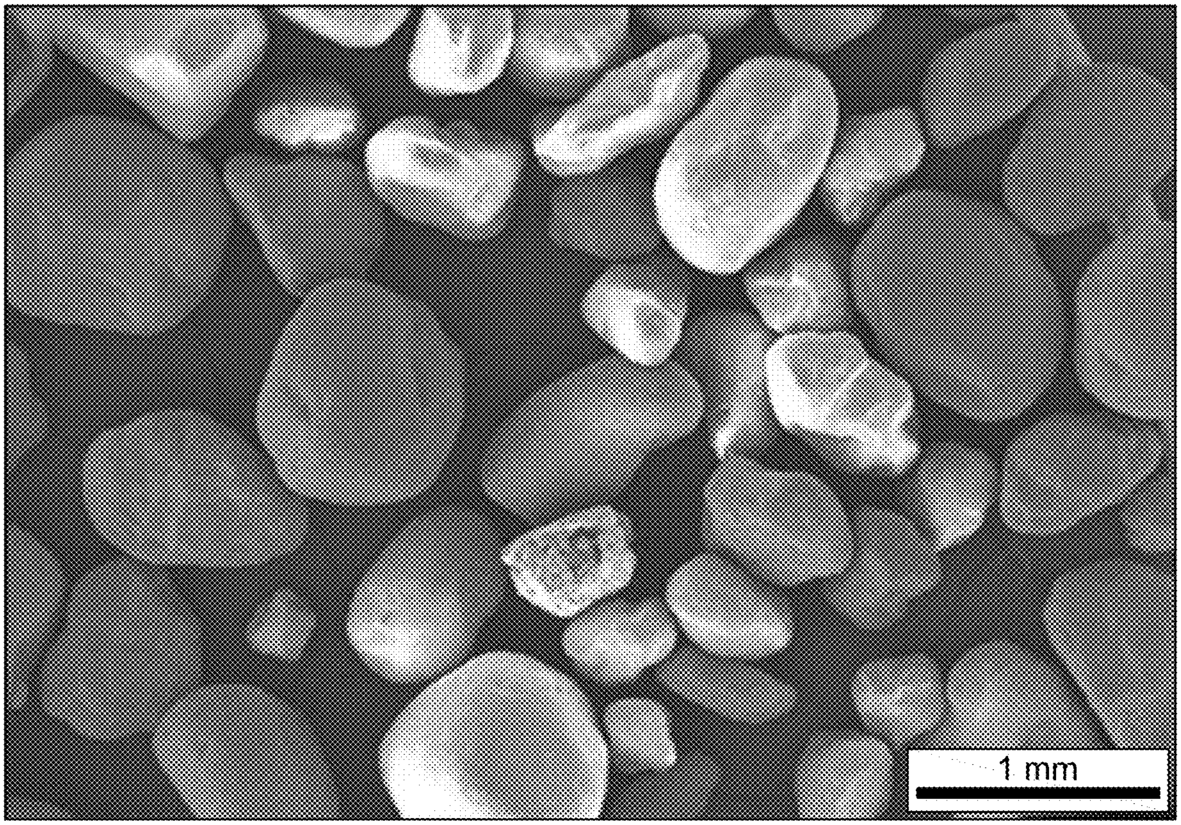
FIG. 7A is a scanning electron microscopy (SEM) image showing the starting sand grains that are mostly well-rounded and consist mainly of quartz and potassium feldspar, according to certain embodiments.
Figure 7B:
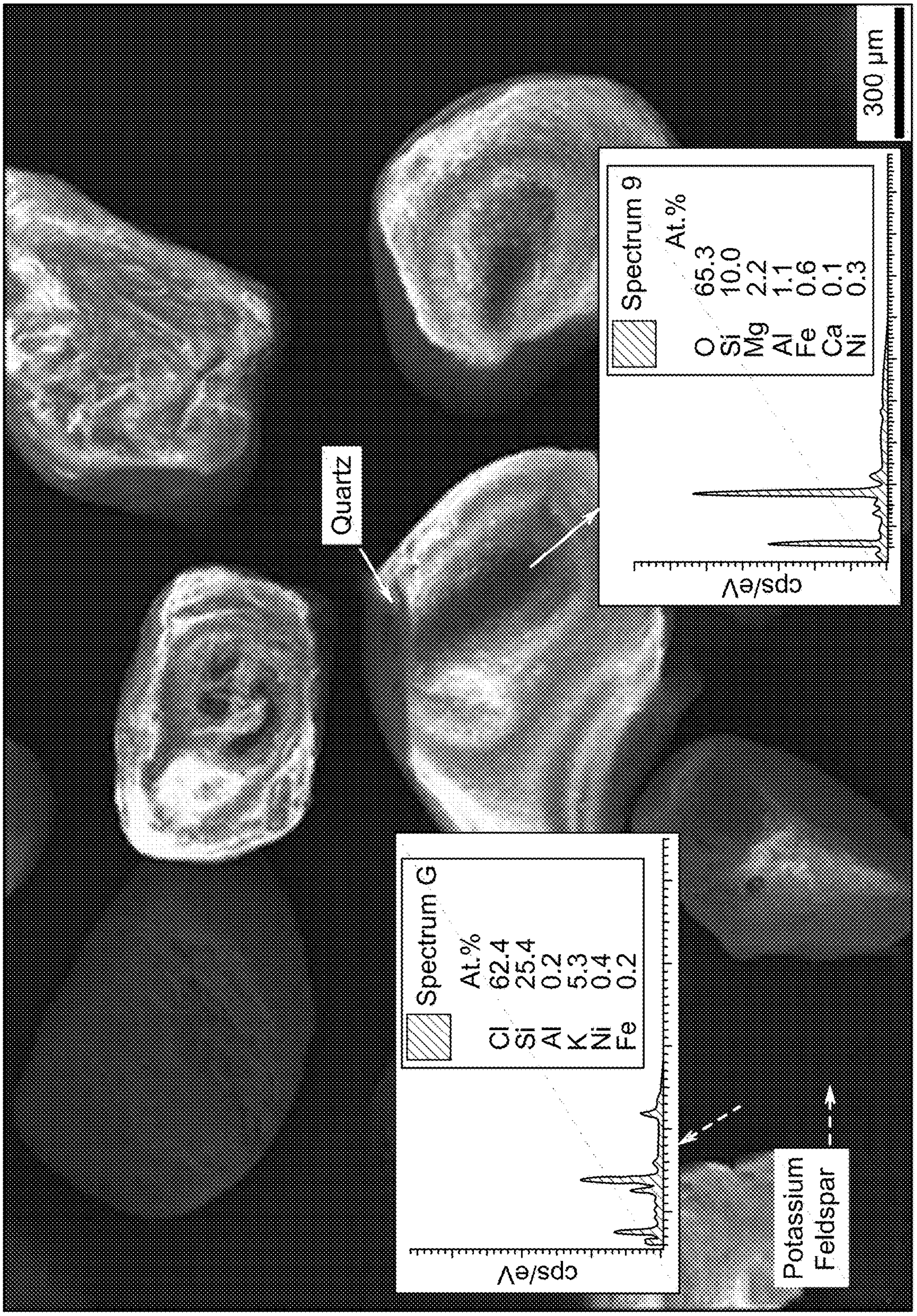
FIG. 7B is a SEM image showing the starting sand grains that are mostly well-rounded and consist mainly of quartz and potassium feldspar, according to certain embodiments.
Figure 7C:
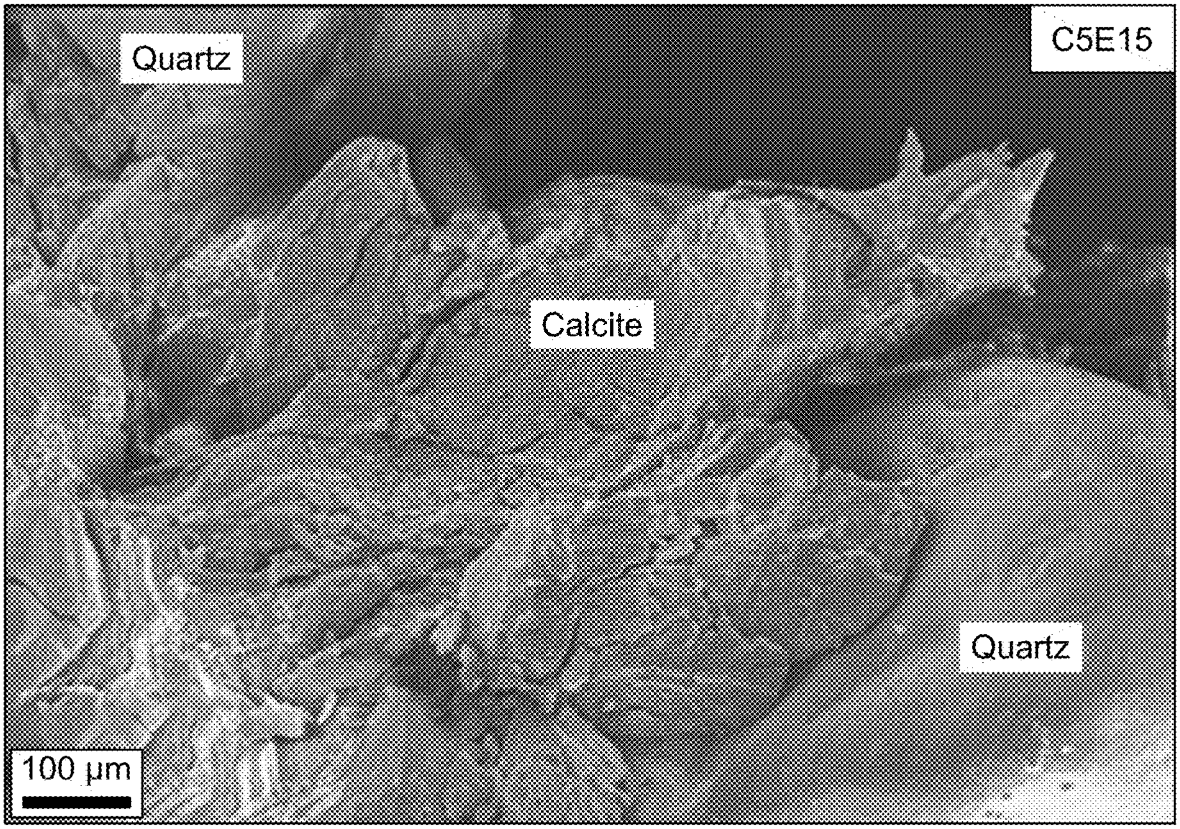
FIG. 7C is a SEM image showing the development of block calcite due to low concentration of $CaCl_2$) (5%), according to certain embodiments.
Figure 7D:
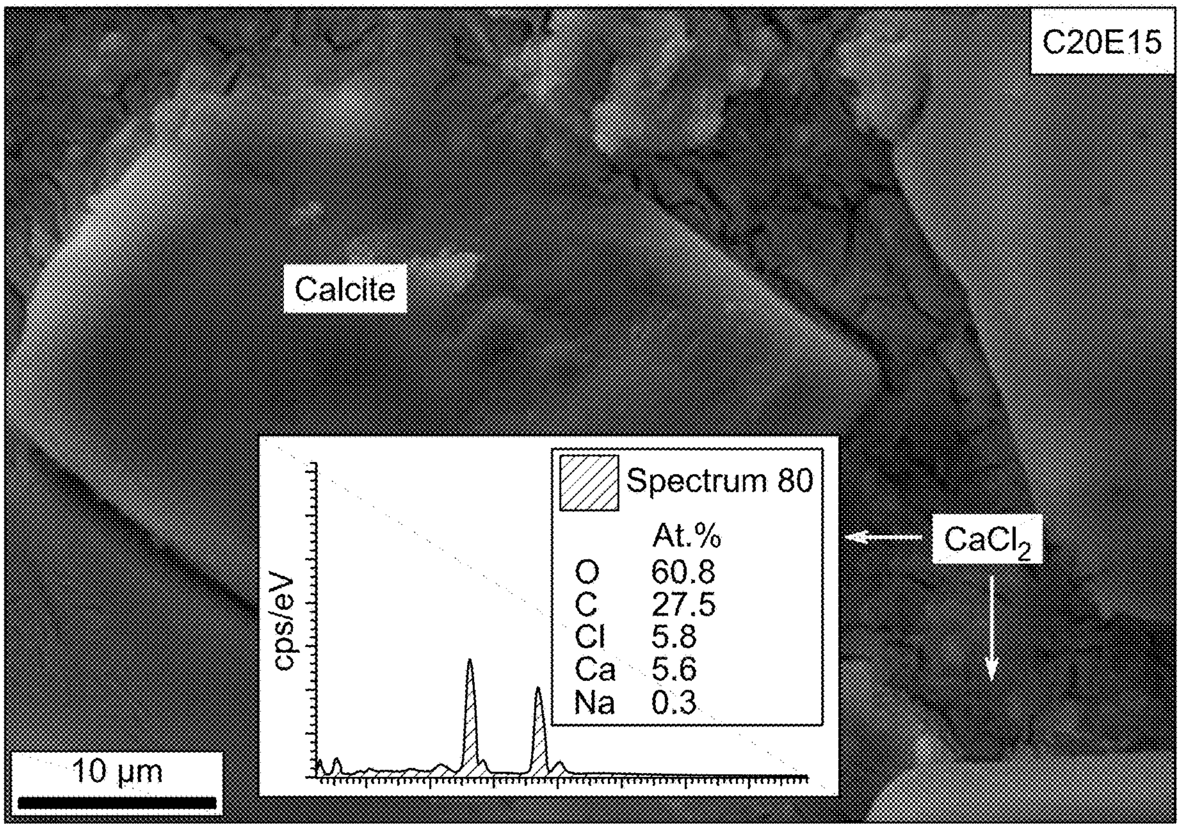
FIG. 7D is a SEM image showing development of rhombohedral calcite in the vicinity of $CaCl_2$), according to certain embodiments.
Figure 7E:
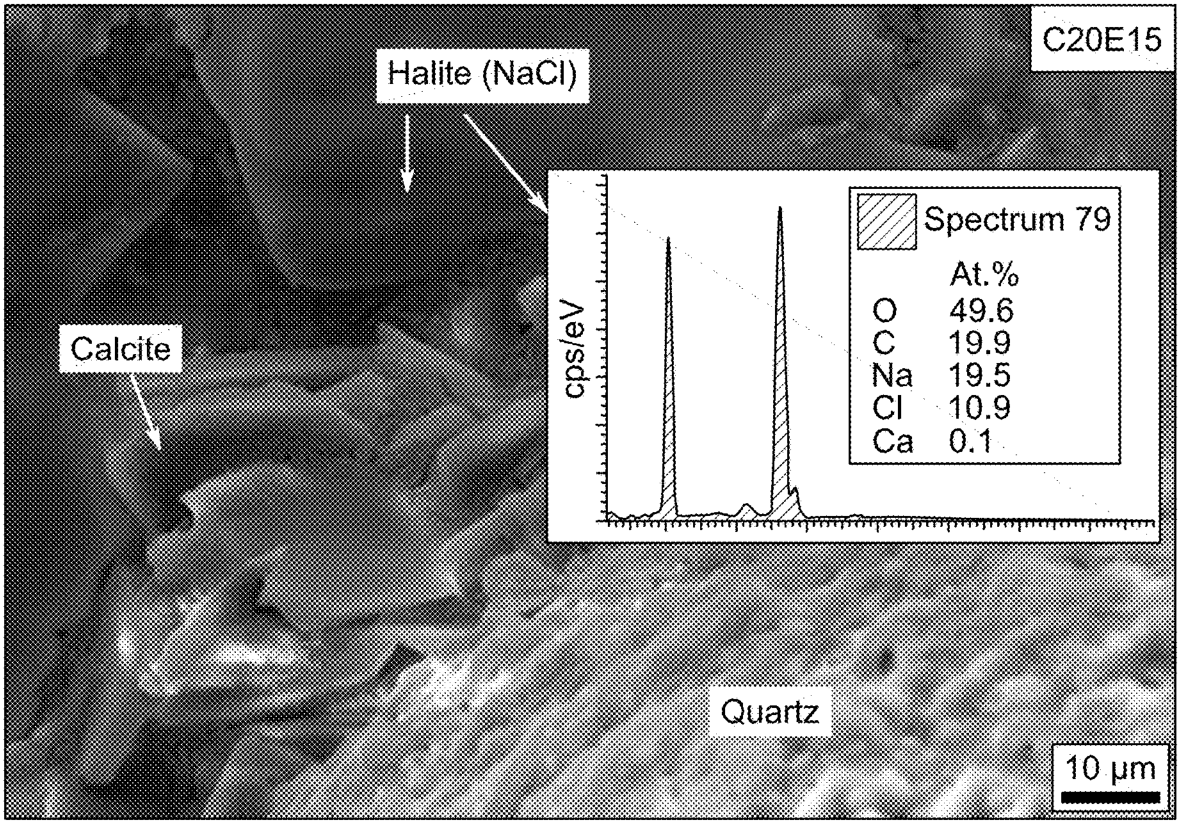
FIG. 7E is a SEM image showing precipitation of pore-filling calcite and halite, filling intergranular porosity as cement, according to certain embodiments.
Figure 7F:
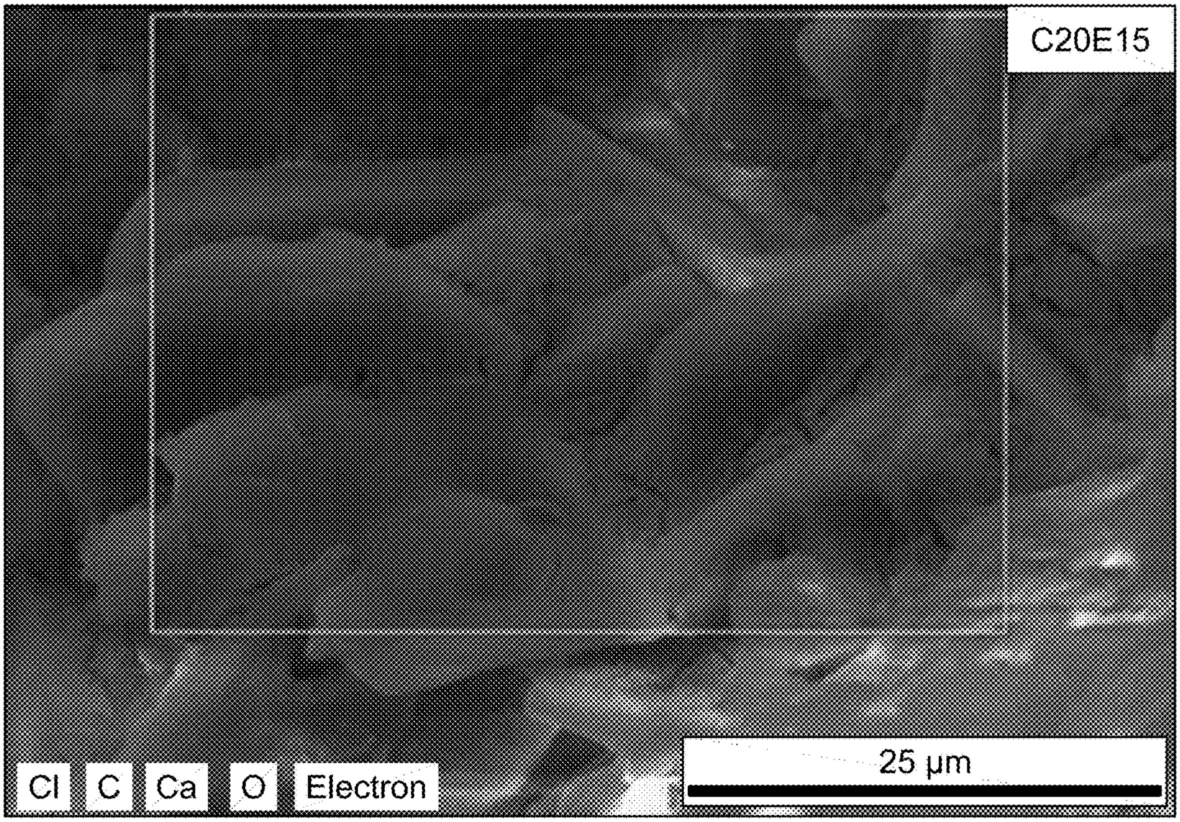
FIG. 7F is an energy dispersive X-ray (EDX) elemental map of calcite grown around calcium chloride, according to certain embodiments.
Figure 7G:
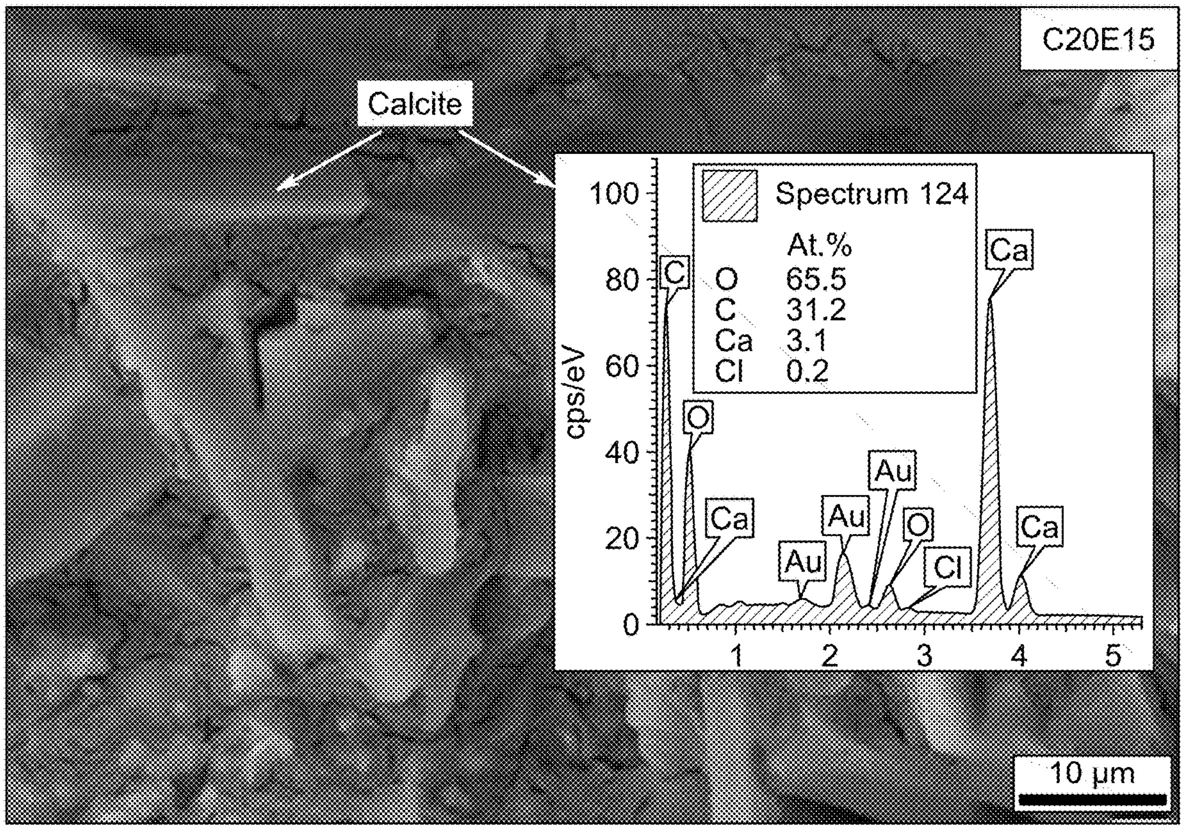
FIG. 7G is a SEM image showing scalenohedral calcite formation around $CaCl_2$), according to certain embodiments.
Figure 7H:
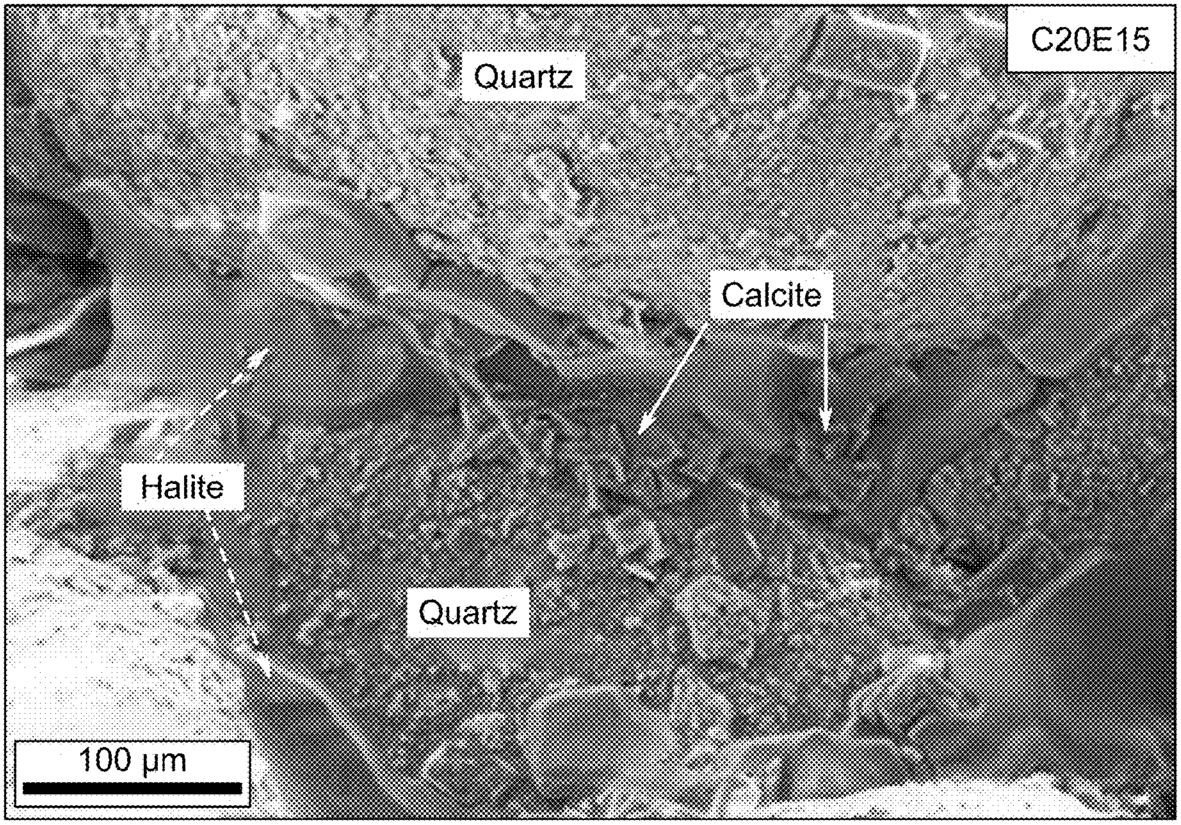
FIG. 7H is a SEM image showing formation of halite and calcite as cement between quartz grains, according to certain embodiments.
Figure 8A:
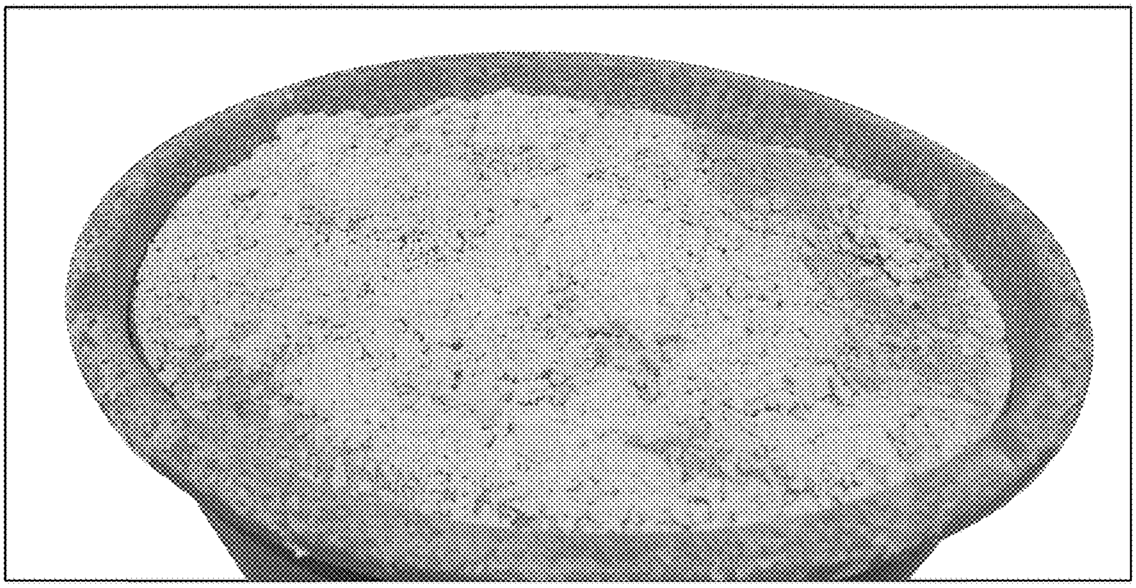
FIG. 8A is an image showing the sand sample covered by carbonates formed from the interaction of atmospheric $CO_2$ and brine recipe (using 10 wt. % $CaCl_2$) solution with 15 wt. % EDTA), according to certain embodiments.

SEM analysis reveals that the starting framework grains consist primarily of quartz and feldspar (FIGS. 7A-7B). The grains are generally well-rounded (FIGS. 7A-7B) and range in diameter from 0.3 to 1.0 millimeters (mm) (average 0.7 mm), indicating coarse sand. Additionally, the untreated sand grains are devoid of any cementing material within their intergranular pores (FIGS. 7A-7B). However, in the treated samples, the SEM analysis shows the presence of calcite (FIGS. 7C-7H), halite (FIG. 7E and FIG. 7H), and calcium chloride (FIG. 7D) as cementing materials. Morphologically, the calcite occurs as both rhombohedral (FIG. 7D) and scalenohedral crystals (FIG. 7G) and, sometimes, as rounded crystals. While halite exhibits both cubic and irregular structures (FIGS. 7E and 7H), the calcium chloride lacks a definite crystal arrangement (FIG. 7D). Moreover, the precipitated halite crystals generally grew in isolation as both grain-coating and pore-filling cement (FIG. 7H). In contrast, it has been noted that the growth of calcite crystals is strongly controlled by the concentration of $CaCl_2$). For instance, blocky, rhombohedral calcite crystals were best developed where the concentration of calcium chloride is low (i.e., 5%; FIG. 7C), and poorly developed where the concentrations of $CaCl_2$) were higher (i.e., greater than 5%; FIG. 7F and FIG. 7G). In cases where the $CaCl_2$) concentrations were high (e.g., >10%), the calcite crystals are generally interwoven with $CaCl_2$) crystals (FIG. 7D and FIG. 7G). This indicates that the higher concentrations of $CaCl_2$) in the solutions impeded the growth of calcite. Three contributing factors were identified to explain the observed inhibition of calcite growth under elevated CaCl2 concentrations. The factors included solubility and saturation constraints, where high concentrations of CaCl2 led to undissolved salt deposits, limiting the availability of Ca2+ ions for calcite precipitation. Further, the factors included hygroscopic nature of CaCl2, where low concentrations of about 5 wt. % allowed effective water absorption and dissolution, in contrast to high concentrations of about 20 wt. %, which impeded water uptake and consequently reduced Ca2+ availability. Furthermore, the factors included elevated solution viscosity, where higher concentrations of CaCl2 increased fluid viscosity and limited ion mobility, restricting the formation of calcite. Notwithstanding these observations, the findings demonstrated that stronger sand consolidation occurred in the presence of substantial quantities of both calcite and calcium chloride. The desert environment presented a particular advantage for serving as a large-scale CO2 sink through surface precipitation of carbonates. Deserts were characterized by extensive sand cover and arid climatic conditions. The mechanism of CO2 sequestration, in this instance, involved the reaction of divalent cation-rich brines, such as calcium chloride (CaCl2), with atmospheric CO2 to form stable carbonate crystals such as calcite or aragonite on the sand surface. The aforementioned process occurred at a rate faster than that of natural geological weathering and mineral entrapment due to the deliberate introduction of reactants and the controlled tuning of environmental conditions. The formation of carbonates on the surface, as illustrated in FIG. 8A, demonstrated the feasibility of converting the desert environment into a sustainable carbon sequestration site. This further indicated that the upper layer of sand functioned as an active CO2-reactive zone.

Figure 8B:
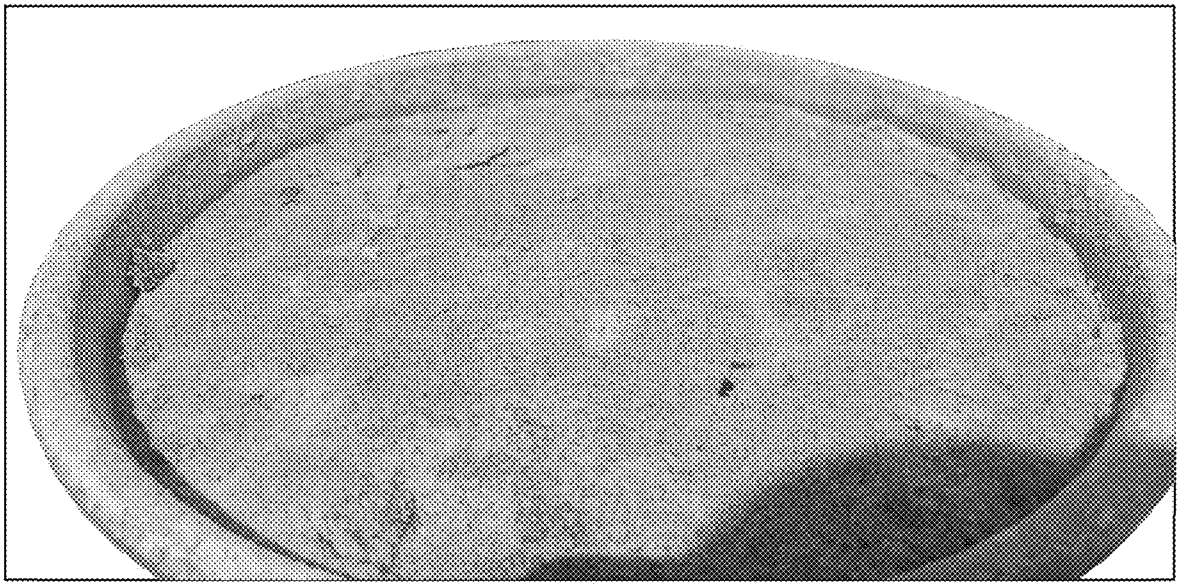
FIG. 8B is an image showing the sand sample covered by carbonates formed from the interaction of atmospheric $CO_2$ and brine recipe (using 20 wt. % $CaCl_2$) solution with 15 wt. % EDTA), according to certain embodiments.

In the initial trials, carbonate formation was observed on the sand surface when a solution including 10 wt. % CaCl2 and 15 wt. % EDTA was employed, shown in FIG. 8A, indicating that CO2 was effectively captured and mineralized. The resultant consolidated layer remained primarily superficial, indicating that enhancement of brine composition and distribution was required to achieve deeper penetration and long-term structural stability. At higher EDTA concentrations, particularly at 20 wt. %, deeper consolidation was observed without the accumulation of excessive surface carbonates, indicating more effective CO2 trapping within the sand matrix, as seen in FIG. 8B. The above findings indicated that the degree of mineralization and the strength of the consolidated sand layer could be modulated by adjusting the concentration and ratio of the reactants, thereby enabling controlled carbonation of both surface and sub-surface layers.

Additionally, the incorporation of natural binders such as gum Arabic and neem gum into the mineralization process was observed to enhance the structural stability of the consolidated sand with favourable results. The use of these biopolymers contributed to moisture retention, which was useful in arid environments where water availability remained limited. The addition of these agents also improved the mechanical strength of the carbonate layer. As a result of utilizing these natural resources, the consolidated sand exhibited increased resistance to wind erosion and potential sandstorms and showed improved durability for long-term $CO_2$ sequestration. However, each polymer under evaluation produced differing permeability profiles in the consolidated layers. It was observed that the gum Arabic-based polymer yielded a more porous consolidated layer relative to that formed using neem gum. The successful demonstration of enhanced consolidation and surface carbonate formation through the addition of natural binders underscored the feasibility of converting desert environments into active carbon capture and storage sites. The potential for large-scale transformation of desert regions into $CO_2$ sinks was evident, with future field trials offering support to global initiatives aimed at reducing atmospheric $CO_2$ concentrations. The described approaches provided a practical solution for mitigating climate change impacts in arid zones while aligning with sustainable land management practices.

Using deserts as $CO_2$ sinks through surface carbonate formation not only reduces atmospheric $CO_2$ but also improves soil quality in arid regions. The chemical makeup of the sandy soil is changed by the carbonate precipitation process, which enriches it with useful minerals like calcium and magnesium that are usually lacking in arid regions. The nutrient profile of the soil is improved by this mineral enrichment, which may make it more favorable for the growth of vegetation. In addition, the carbonate layer serves as a stabilizing agent, helping to retain moisture, reduce wind erosion, and bind loose sand particles together, all of which contribute to the health of the soil in arid regions. This strategy provides a sustainable way to repair damaged soil, fight desertification, and make these areas more resilient to climate extremes by converting huge, desolate deserts into active $CO_2$ sinks. Enhancements in soil quality have the potential to facilitate the growth of vegetation thereby creating a positive feedback loop whereby improved soil conditions increase the uptake of carbon and improve ecological balance.

Utilizing $CO_2$ mineralization for sand consolidation has a positive effect on the environment since it provides a natural, chemical-free method of using $CO_2$, a greenhouse gas, to improve the topsoil and manage dust. Because the method converts $CO_2$ into stable mineral forms like calcite or aragonite, atmospheric $CO_2$ levels are lowered and sand displacement, which can exacerbate desertification and land degradation, is prevented. Moreover, water can percolate through the deeper porous layers, preserving the hydrological equilibrium and promoting plant growth. In areas susceptible to sand and dust storms, this environmentally friendly strategy helps to alleviate the consequences of climate change and promotes sustainable land management.

From a scalability perspective, the method as described herein may be applicable across extensive arid and semi-arid regions susceptible to sand movement, including deserts, agricultural lands, and coastal zones. An adaptability of the present disclosure to diverse sand compositions and brine formulations allowed for customization based on local conditions, rendering it suitable for deployment in large-scale environmental management projects. The core inputs, brines enriched with divalent cations, were locally sourced, thereby reducing both implementation costs and logistical challenges. The ability of the present disclosure to selectively consolidate topsoil while preserving subsurface permeability enabled application without disruption to surrounding ecosystems. Additionally, the method as described herein operated synergistically with other sand movement mitigation strategies such as vegetation and physical barriers. Whereas vegetation stabilized the soil over time by anchoring it with root structures, $CO_2$ mineralization functioned as an immediate reinforcement mechanism to prevent erosion. Similarly, while fences diverted wind currents and trapped mobile sand, mineralization caused the immobilized sand to remain in place. In combination, the method provided a multilayered, integrated defence against sand and dust storms. Therefore, the convergence of physical, chemical, and biological interventions presented a holistic solution for desertification prevention and land restoration.

The aspects of the present disclosure provided a method for transforming atmospheric carbon dioxide into calcium carbonate, thereby consolidating a top layer of sand. This approach will be used with vegetation and/or fences to suppress sand or dust storm-related issues in addition to lowering atmospheric carbon dioxide levels. The sand surface could be compacted over several kilometers using this method. More practically, within vegetated regions and on either side of transportation routes, the method can lead to no sand being lifted within a range of several kilometres from sandstorm hotspot zones. Thus, applications of this approach in controlling the sand movement process and reducing atmospheric carbon have been the main topic of discussion thus far. Soil stabilization is another area in which the approach described can be applied, including in consolidation or increasing stability of soil contaminated with heavy metals. This method reduces the mobility and bioavailability of heavy metals by locking them into stable precipitates and stabilizing the soil structure, which prevents erosion and dust formation. Because of this reduced chance of heavy metals seeping into groundwater, the soil is safer for farming and other land use applications. Furthermore, the physical stabilization of polluted locations is enhanced by the consolidation of soil by $CO_2$ mineralization, lowering the possibility of contamination spread through wind or water erosion. This environmentally benign technology uses the natural interaction between $CO_2$ and minerals to sequester $CO_2$ and treat heavy metals, in contrast to typical heavy metal remediation techniques. Furthermore, by varying the cation content and $CO_2$ exposure, the process may be adapted to various soil types and contamination levels, making it a flexible alternative for managing mining or industrial sites with high levels of heavy metal contamination.

A recent challenge addressed by the method as described herein was the excessive accumulation of sand particles around telecommunication towers, which necessitated the use of heavy machinery such as bulldozers to clear deposited sand before access could be gained to the tower base or associated equipment. In such cases, the method was applied in addition to afforestation efforts, to stabilize the sand in proximity to the telecommunication structures. The consolidation of loose sand around these installations reduced the extent of sand deposition, thereby protecting communication infrastructure. This, in turn, improved site accessibility and reduced the frequency and intensity of mechanical removal operations required for maintenance activities. While sand deposits were traditionally removed using bulldozers to enable technician access, the use of sand consolidation reduced the volume of sand requiring clearance, thereby improving operational efficiency and extending the serviceability of such infrastructure. Consequently, the scalability and functional adaptability of the method were enhanced in the context of this application.

The described method of transforming atmospheric carbon dioxide into calcium carbonate precipitates offers a practical and adaptable solution for managing a range of environmental and geotechnical challenges in sandy and arid regions. By using naturally occurring precipitates and polymer additives, this method effectively stabilizes the topsoil, reducing sand and dust mobility while maintaining water permeability and removing atmospheric carbon. Its scalability allows for diverse applications, including desertification control, treatment of heavy metal-contaminated soils, improving ground stability, and dust suppression in operational environments. Additionally, it holds potential for use in infrastructure development, such as site preparation for drilling and the fabrication of building materials, highlighting its value as a sustainable and multifunctional approach.

Numerous modifications and variations of the present disclosure are possible in light of the above teachings. It is therefore to be understood that within the scope of the appended claims, the disclosure may be practiced otherwise than as specifically described herein.

The invention claimed is:

1. A method for transforming atmospheric $CO_2$ into calcium carbonate on the surface of a desert, comprising:

spraying a composition comprising $CaCl_2$ and ethylenediaminetetraacetic acid (EDTA) onto a top layer of sand of the desert, wherein the top layer of sand has a depth of up to 50 mm; and drying the composition for 0.5 to 7 days to form a dried sand layer, repeating the spraying and drying for at least 4 cycles, wherein the composition does not penetrate beyond the top layer of sand, wherein atmospheric $CO_2$ is absorbed into the composition and reacts with the $CaCl_2$) during drying to form a calcium carbonate precipitate in the dried sand layer, wherein the calcium carbonate precipitate binds individual grains of sand together, thereby forming a consolidated layer of sand, and wherein the consolidated layer of sand has an average consolidated density in a range from 1.6 to 2.8 g/cc.

2. The method of claim 1, wherein composition comprises from 1 to 35 weight % (wt. %) $CaCl_2$) and from 2.5 to 30 wt. % EDTA, based on the total weight of the composition.

3. The method of claim 2, wherein composition comprises from 5 to 30 weight % (wt. %) $CaCl_2$) and from 5 to 25 wt. % EDTA, based on the total weight of the composition.

4. The method of claim 3, wherein composition comprises from 10 to 25 weight % (wt. %) $CaCl_2$) and from 5 to 20 wt. % EDTA, based on the total weight of the composition.

5. The method of claim 4, wherein composition comprises from 10 to 20 weight % (wt. %) $CaCl_2$), and from 10 to 20 wt. % EDTA, based on the total weight of the composition.

6. The method of claim 5, wherein composition comprises from 10 to 20 weight % (wt. %) $CaCl_2$) and 15 wt. % EDTA, based on the total weight of the composition.

7. The method of claim 1, wherein the composition further comprises a gum selected from the group consisting of neem, gum Arabic, and combinations thereof.

8. The method of claim 7, wherein composition comprises from 1 to 35 weight % (wt. %) $CaCl_2$), from 1 to 20 wt. % of the gum, and from 2.5 to 30 wt. % EDTA, based on the total weight of the composition.

9. The method of claim 8, wherein composition comprises from 5 to 30 weight % (wt. %) $CaCl_2$), from 5 to 15 wt. % of the gum, and from 5 to 25 wt. % EDTA, based on the total weight of the composition.

10. The method of claim 9, wherein composition comprises from 10 to 25 weight % (wt. %) $CaCl_2$), from 7.5 to 12.5 wt. % of the gum, and from 5 to 20 wt. % EDTA, based on the total weight of the composition.

11. The method of claim 10, wherein composition comprises from 10 to 20 weight % (wt. %) $CaCl_2$), from 7.5 to 12.5 wt. % of the gum, and from 10 to 20 wt. % EDTA, based on the total weight of the composition.

12. The method of claim 11, wherein composition comprises from 10 to 20 weight % (wt. %) $CaCl_2$), 10 wt. % of the gum, and 15 wt. % EDTA, based on the total weight of the composition.

13. The method of claim 1, wherein the composition is produced by adding EDTA to wastewater.

14. The method of claim 1, wherein the top layer of sand comprises sand grains with an average grain size in a range from 150 to 1200 μm.

15. The method of claim 14, wherein the top layer of sand comprises sand grains with an average grain size in a range from 300 to 1000 μm.

16. The method of claim 15, wherein the top layer of sand comprises sand grains with an average grain size in a range from 500 to 900 μm.

17. The method of claim 1, wherein the temperature of the top layer of sand during the drying is in a range from 25 to 60° C.

18. The method of claim 17, wherein the temperature of the top layer of sand during the drying is in a range from 35 to 50° C.

19. The method of claim 1, wherein the consolidated layer of sand has a depth in a range from 10 to 22 mm.

20. The method of claim 19, wherein the consolidated layer of sand has an average consolidated density in a range from 2.0 to 2.4 g/cc.

* * * * *